United States Patent [19]

Sugano

[11] Patent Number: 4,665,776
[45] Date of Patent: May 19, 1987

[54] HYDRAULIC CONTROL SYSTEM WITH 4-2 TIMING ARRANGEMENT FOR AUTOMATIC TRANSMISSION

[75] Inventor: Kazuhiko Sugano, Zama, Japan

[73] Assignee: Nissan Motor Co., Ltd., Yokohama, Japan

[21] Appl. No.: 581,507

[22] Filed: Feb. 17, 1984

[30] Foreign Application Priority Data

Feb. 21, 1983 [JP] Japan ................................ 58-26301

[51] Int. Cl.⁴ ............................................ B60K 41/16
[52] U.S. Cl. ........................................ 74/867; 74/869
[58] Field of Search ............... 74/869, 868, 867, 865, 74/759, 758

[56] References Cited

U.S. PATENT DOCUMENTS

| | | | |
|---|---|---|---|
| 3,136,175 | 6/1964 | Ivey | 74/472 |
| 3,656,373 | 4/1972 | Shimosaki | 74/869 |
| 3,707,890 | 1/1973 | Ito | 74/868 |
| 3,710,638 | 1/1973 | Sakai | 74/867 X |
| 3,728,915 | 4/1973 | Clark | 74/868 |
| 3,896,685 | 7/1975 | Shellman | 74/869 |
| 4,334,441 | 6/1982 | Iwanaga et al. | 74/868 |
| 4,413,536 | 1/1975 | Whitney et al. | 74/869 |
| 4,446,759 | 5/1984 | McCrary | 74/867 |
| 4,467,675 | 8/1984 | Sugano et al. | 74/869 |
| 4,474,084 | 10/1984 | Sugano et al. | 74/869 |
| 4,476,747 | 10/1984 | Kawamoto | 74/869 |

FOREIGN PATENT DOCUMENTS

| | | |
|---|---|---|
| 2931611 | 2/1980 | Fed. Rep. of Germany . |
| 3327500 | 2/1985 | Fed. Rep. of Germany . |
| 0131458 | 8/1983 | Japan ................ 74/869 |
| 2108604 | 5/1983 | United Kingdom ........ 74/869 |

Primary Examiner—Allan D. Herrmann
Assistant Examiner—Dirk Wright
Attorney, Agent, or Firm—Schwartz, Jeffery, Schwaab, Mack, Blumenthal & Evans

[57] ABSTRACT

Disclosed herein is a hydraulic control system for an automatic transmission wherein a first friction unit (C3) is engaged and a second friction unit (C2) is disengaged in downshifting from the 4th speed ratio to the 2nd speed ratio. An orifice device (660) is disposed in a fluid supply passage to a second port (124h) of a 3-4 shift valve (24) which is allowed to communicate with a first port (124g) communicating with the first friction unit (C3) when the 3-4 shift valve assumes a downshift position thereof. A timing valve (23) is arranged to provide a first bypass passage bypassing the orifice device when a fluid pressure in the second friction unit (C2) is lower than a predetermined value. A second bypass passage is provided to bypass the orifice device when the 2-3 shift valve (22) assumes an upshift position thereof.

5 Claims, 6 Drawing Figures

4,665,776

HYDRAULIC CONTROL SYSTEM WITH 4-2 TIMING ARRANGEMENT FOR AUTOMATIC TRANSMISSION

CROSS-REFERENCES TO RELATED APPLICATIONS

Reference are made to the following related copending applications, filed by the same applicant as that of the present application; U.S. patent application Ser. No. 494,647, filed May 16, 1983 U.S. patent application Ser. No. 507,228, filed June 23, 1983 U.S. patent application Ser. No. 518,413, filed July 29 1983 U.S. patent application Ser. No. 518,540, filed July 29, 1983 U.S. patent application Ser. No. 518,681 filed July 29, 1983 U.S. patent application Ser. No. 518,745 filed July 29, 1983 and U.S. patent application Ser. No. 518,746 filed July 29, 1983.

References are also made to the following related applications, each filed by the same applicant as that of the present application and concurrently with the present application: U.S. patent application Ser. No. 581,508; U.S. Pat. No. 4,555,964 and U.S. patent application Ser. No. 581,509.

BACKGROUND OF THE INVENTION

The present invention relates to a hydraulic control system for an automatic transmission.

Automatic transmissions are known wherein one friction unit is engaged and another friction unit is disengaged to effect a shifting between speed ratios, i.e., between drive ratios. In operating such automatic transmissions, if the engagement of the one friction unit does not take place in good timed relationship with the disengagement of the another friction unit, substantial shocks will take place or an engine will be raced. It is therefore desired that the engagement and disengagement timing be set to optimum over all of the running states of an automotive vehicle. An automatic transmission is known wherein one friction unit is engaged during operation with two speed ratios, if the engagement of this friction unit is effected in the same timing in shifting into one of the two speed ratio from another speed ratios as in shifting from the other of the two speed ratios from the another speed ratio, optimum performance in each of the shifting operations cannot be realized. Taking, for example, an automatic transmission wherein a clutch is engaged during operation with the second and third speed ratios and released during operation with the fourth speed ratio, if the clutch is engaged in the same timing in downshifting from the fourth speed ratio to the second speed ratio as in downshifting from the fourth speed ratio to the third speed ratio, the optimum performance in each of the downshiting is hardly obtained because a difference between a change in engine torque and a change in engine revolution speed before and after the shifting are different in the case of 4-2 downshifting from those in the case of 4-3 downshifting. That is, if, with the optimum timing for the 4-3 downshifting, the clutch is engaged in 4-2 downshifting, substantial shocks will take place. On the contrary, if, with the optimum timing for the 4-2 downshifting, the clutch is engaged in 4-3 downshifting, the engine will be raced. Therefore, a problem resides in that optimum shifting operation cannot be obtained in each of downshifting from n+2 th speed ratio to n+1 th speed ratio and downshifting from the n+2 th speed ratio to n th speed ratio, where: n is a positive integer.

SUMMARY OF THE INVENTION

According to the present invention, a hydraulic control system comprises a first shift valve having an outlet port, a second shift valve having a first port communcating with a friction unit which is to be engaged in downshifting not only from a n+2 th speed ratio to a n+1 th speed ratio but also from the n+2 th speed ratio to a n th speed ratio and a second port which is allowed to communicate with the first port when the second shift valve assumes a downshift position thereof, an orifice device disposed in a fluid supply passage to the second port of the second shift valve, a timing valve responsive to an increase in fluid pressure in the outlet port of the first shift valve for providing a first bypass passage bypassing the orifice device, and means for providing a second bypass passage bypassing the orifice device at least when the first shift valve assumes an upshift position thereof.

An object of the present invention is to provide a hydraulic control system which provides an optimum downshifting from a n+2 th speed ratio, where n is a positive integer, to a n+1 th speed ratio and an optimum downshifting from the n+2 th speed ratio to a n th speed ratio without relying on a complicated valve structure.

BRIEF DESCRIPTION OF THE DRAWINGS

FIG. 4 is a cross-sectional view of the 4-2 timing valve of the invention taken along line IV—IV of FIG. 3.

DETAILED DESCRIPTION OF THE INVENTION

Figure 1:
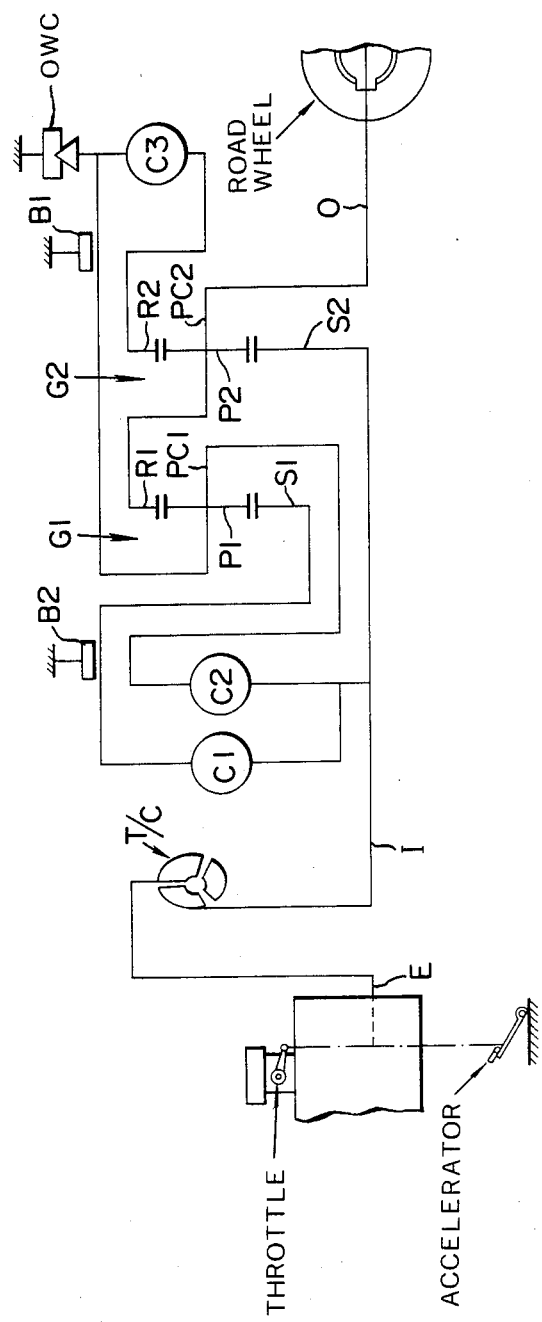
FIG. 1 is a schematic view of a power transmission mechanism of a four speed automatic transmission as illustrated with an engine having a throttle and an accelerator.

Referring to FIG. 1, there is illustrated a power transmission mechanism of a four forward speed and one reverse speed automatic transmission having an overdrive. This power transmission mechanism comprises an input shaft I operatively connected via a torque converter T/C to an engine output shaft E of an engine which has a throttle which opens in degrees, an output shaft O operatively connected to road wheels, only one being shown, via a final drive, not shown. A first planetary gear set G1 and a second planetary gear set G2 are connected between the input and output shafts I and O. A plurality of fluid operated friction units are provided which are made operative and inoperative for producing a plurality of speed ratios between the input shaft I and output shaft O. The fluid operated friction units include a first clutch C1, a second clutch C2, a third clutch C3, a first brake B1, a second brake B2, and a one-way clutch OWC. The first planetary gear set G1 comprises a sun gear S1, an internal gear R1, a carrier PC1 carrying pinion gears P1 meshing simultaneously both the gears S1 and R1. The planetary gear set G2 comprises a sun gear S2, an internal gear R2 and a carrier PC2 carrying pinion gears P2 meshing simultaneouly both gears S2 and R2. The carrier PC1 is connectable via the clutch C1 with the input shaft I, and the sun gear S1 is connectable via the clutch C2 with the input shaft I. The carrier PC1 is connectable via the clutch C3 with the internal gear R2. The sun gear S2 is constantly connected with the input shaft 1. The internal gear R1 and carrier PC2 are constantly connected with the output shaft 0. The brake B1 is arranged to anchor the carrier PC1. The brake B2 is arranged to anchor the sun gear S1. The one-way clutch OWC is so constructed that it allows forward rotation (i.e., the same rotation as that of the engine output shaft E), but prevents reverse rotation (i.e., the rotation opposite to the forward rotation). Thus, it acts as a brake only during reverse rotation.

In the above mentioned power transmission mechanism, the rotational state of each of the rotary elements (S1, S2, R1, R2, PC1, and PC2) of the planetary gear sets G1 and G2 can be varied by actuating selected one or combination of the clutches C1, C2 and C3, brake B1, (one-way clutch OWC) and brake B2, thus varying the revolution speed of the output shaft 0 relative to that of the input shaft I. The four forward speed ratios and one reverse speed ratio are produced if the clutches C1, C2 and C3 and brakes B1 and B2 are engaged in the manner as shown in the following Table.

TABLE

| | C1 | C2 | C3 | B1 (OWC) | B2 | Gear Ratio | $\alpha 1 = 0.45$ $\alpha 2 = 0.45$ |
|---|---|---|---|---|---|---|---|
| 1st speed | o | | | o | | $\dfrac{1+\alpha 2}{\alpha 2}$ | 3.22 |
| 2nd speed | o | | | | o | $\dfrac{\alpha 1+\alpha 2}{\alpha 2(1+\alpha 1)}$ | 1.38 |
| 3rd speed | o | o | | | | 1 | 1 |
| 4th speed | | o | | | o | $\dfrac{1}{1+\alpha 1}$ | 0.69 |
| Reverse | | o | o | | | $-\dfrac{1}{\alpha 1}$ | −2.22 |

In the above Table, a sign "o" denotes actuation state of the clutch or brake, $\alpha 1$ and $\alpha 2$ respectively denote ratios of number of teeth of the internal gears R1 and R2 to number of teeth of the corresponding sun gears S1 and S2. A gear ratio is a ratio of the revolution number of the input shaft I to that of the output shaft 0. What is denoted by the label (OWC) below the brake B1 means that the first speed ratio is produced owing to the action of the one-way clutch OWC even if the brake B1 is not applied. However, in this first speed ratio, it is not possible for the output shaft 0 to drive the engine (that is, no engine braking is effected).

Figure 2:
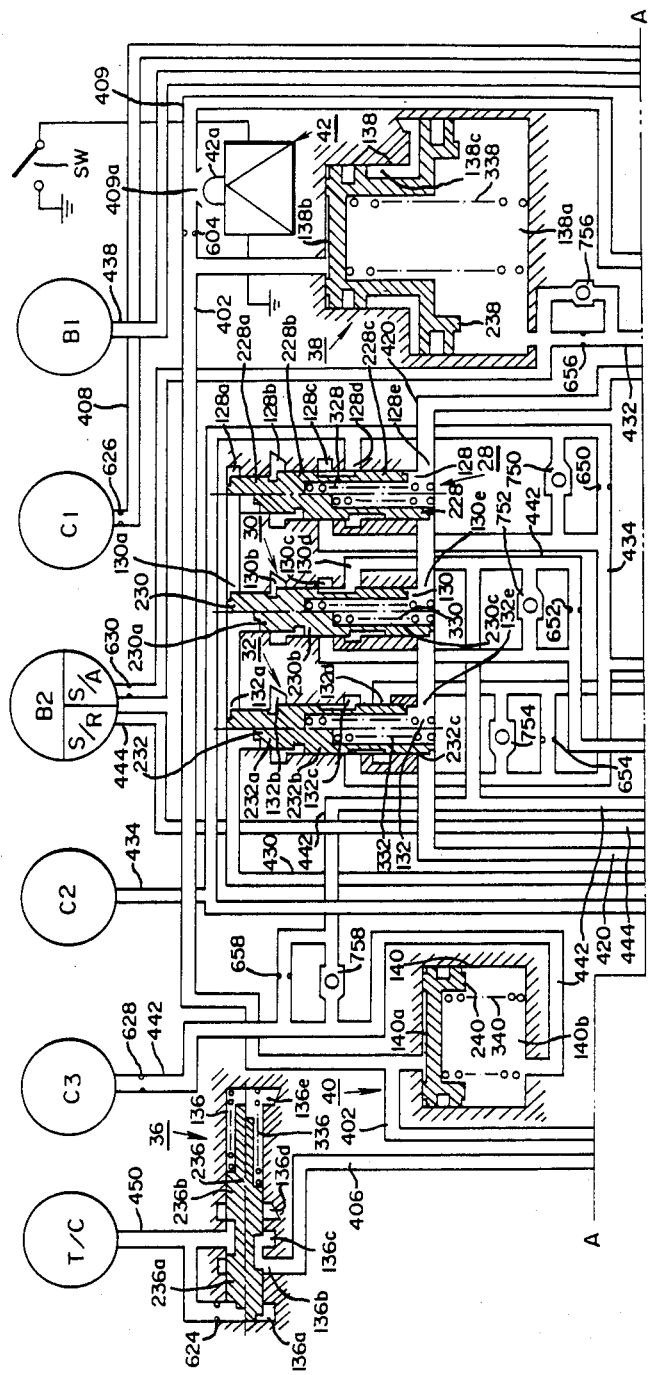
FIGS. 2(a), 2(b), 2(c) and 2(d), when combined, illustrate an embodiment of a hydraulic control system for the automatic transmission according to the present invention.
Figure 2B:
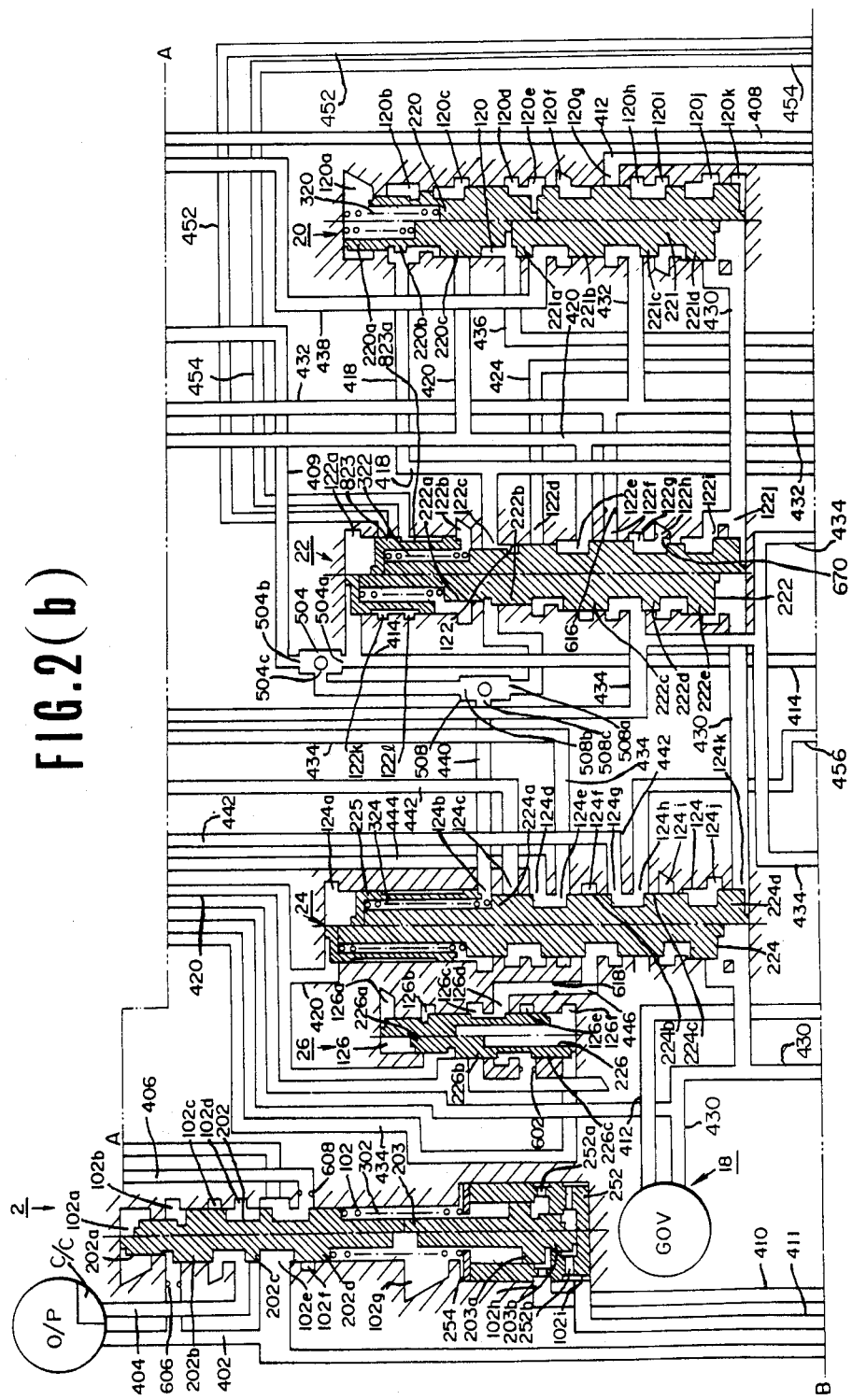
Figure 2C:
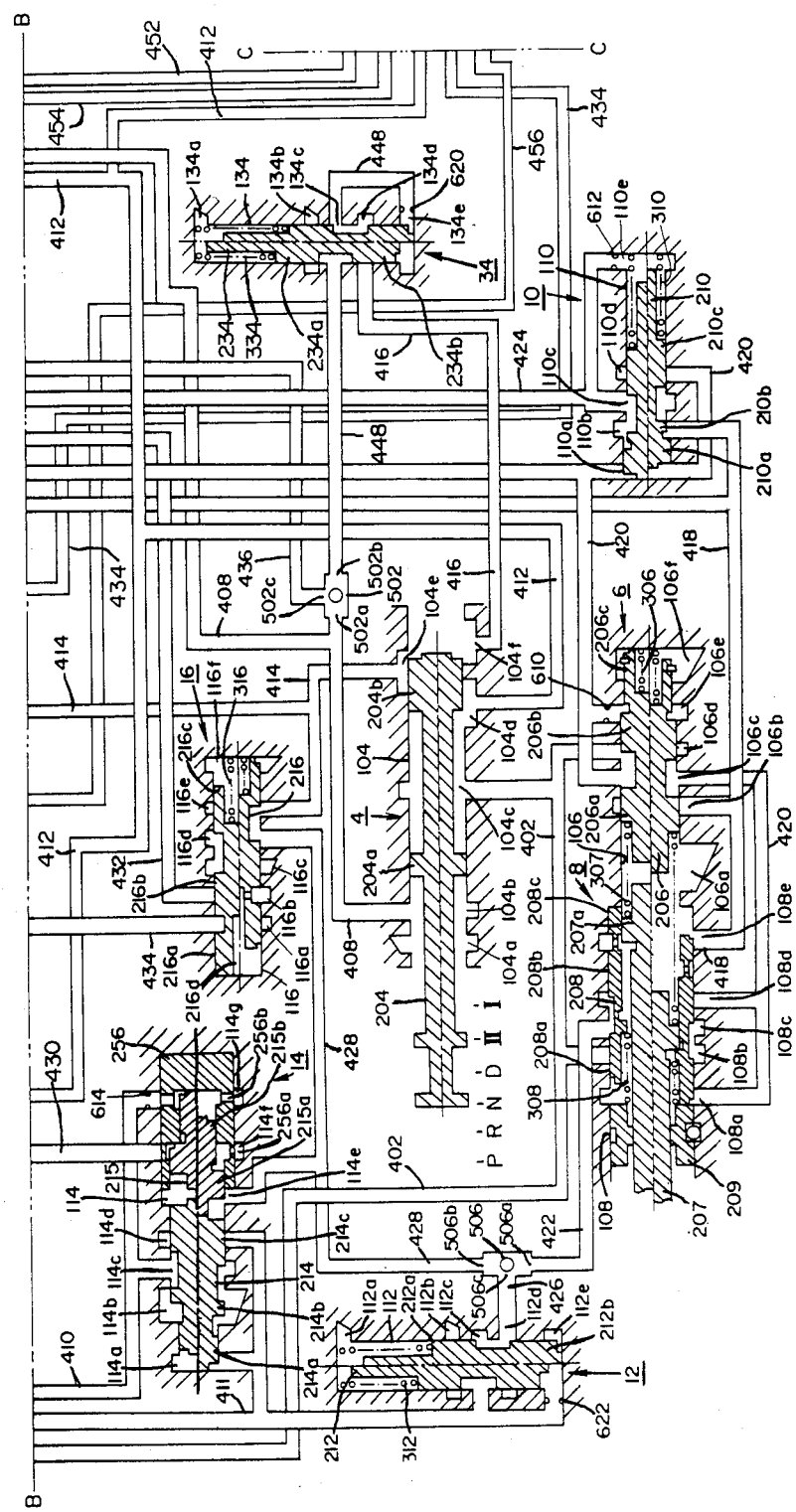

Referring to FIGS. 2(a), 2(b), 2(c) and (2d), a hydraulic control system for the above power transmission mechanism is described.

This hydraulic control system comprises a regulator valve 2, a manual valve 4, a throttle valve 6, a throttle fail safe valve 8, a throttle modulator valve 10, a pressure modifier valve 12, a cut back valve 14, a line pressure booster valve 16, a governor valve 18, a 1-2 shift valve 20, a 2-3 shift valve 22, a 4-2 timing valve 23, a 3-4 shift valve 24, a 2-4 timing valve 26, a 2-3 timing valve 28, a 3-4 timing valve 30, a 3-2 timing valve 32, a first manual range pressure reducing valve 34, a torque converter pressure reducing valve 36, a 1-2 accumulator 38, a 4-3 accumulator 40, and an overdrive inhibitor solenoid 42. These valves are interconnected as shown in FIGS. 2(a), 2(b), 2(c) and 2(d), and connected with an oil pump O/P, the torque converter T/C, clutches C1, C2, C3 and brakes B1, B2 as shown. The brake B2 has a servo apply chamber S/A, i.e., an oil pressure chamber designed to apply the brake when pressurized, and a servo release chamber S/R, i.e., an oil pressure chamber designed to release the brake when pressurized. Since the servo release chamber S/R has a larger pressure acting area than a pressure acting area of the servo apply chamber S/A, the brake B2 is released when the pressure is supplied to the servo release chamber S/R irrespective of the supply of oil pressure to the servo apply chamber S/A. The overdrive inhibitor solenoid 42 is electrically connected with an overdrive inhibitor switch SW.

The construction and operation of each of the valves are described.

Referring to FIG. 2(b), the regulator valve 2 comprises a valve bore 102 formed with nine ports 102a to 102i and a spool 202 having formed thereon four lands 202a to 202d slidably disposed in the valve bore 102. It also comprises a stationary sleeve 252, formed with two ports 252a and 252b, fixed relative to the valve bore 102, a spool 203 having formed thereon lands 203a and 203b slidably disposed in the stationary sleeve 252, and a spring 302 arranged between the land 202d of the spool 202 and a spring seat 254 mounted on the upper end of the sleeve 252 as viewed in FIG. 2(b). The lands 202b, 202c and 202d are the same in diameter, and the land 202a is smaller in diameter than the same diameter lands. The land 203a of the spool 203 is larger in diameter than the land 203b thereof. The ports 102a, 102c and 102g are drain ports. The ports 102b and 102e are connected with an oil conduit 402 (the line pressure circuit). An orifice 606 is provided in the inlet to the port 102b. The port 102d is connected via an oil conduit 404 with a variable volume chamber C/C of the oil pump O/P. The oil pump O/P is a vane pump of the variable volume discharge type and is designed to decrease the discharge rate of the oil flow in response to an oil pressure supplied to the oil chamber C/C. The port 102f is connected via an oil conduit 406 with a port 136b of a torque converter pressure reducing valve 36 shown in FIG. 2(a). An orifice 608 is provided in the oil conduit 406. The port 102h is connected via an oil conduit 410 with ports 114c and 114g of the cut back valve 14, while the port 102i is connected via an oil conduit 411 with ports 114a and 114d of the cut back valve 14 and also with ports 112c and 112e of the pressure modifier valve 12.

The regulator valve 2 regulates the line pressure in the oil conduit 402 in the following manner. Oil pressure from the port 102b acts on a differential area between the lands 202a and 202b of the spool 202, applying a downward force, as viewed in FIG. 2b), to the spool 202. On the other hand, the spool 202 is subject to the sum of an upward force by the spring 302 and another upward force (which is later described) by the spool 203. Since the oil within the port 102e which the port 102b is connected with is adapted to be discharged to the port 102f, the oil pressure in the port 102b is regulated to a value at which the dowaward force created by the oil pressure in the port 102b balances with the sum of the two upward forces. If, as a result of an increase in the oil pressure in the port 102b the downward force increases above the sum of the upward forces, the spool 202 slightly moves downward, forming a clearance between the land 202d and the port 102f, allowing the oil in the port 102e to flow via this clearance to the port 102f resulting in a reduction in the oil pressure in the port 102e which in turn results in a reduction in the oil pressure in the port 102b which communicates via the oil conduit 402 with the port 102e. The reduction in the oil pressure in the port 102b causes a reduction in the downward force, allowing the spool 202 to move back upward. After this action is repeated continuously, the oil pressure in the port 102b, i.e., the oil pressure in the oil conduit 402 is regulated to a value at which the downward force always balances with the sum of the upward forces. The oil pressure regulated in this manner (i.e., the line pressure) is variable with the upward force by the spool 203 because the force due to the spring 302 is constant. As shown, the ports 102h and 102i of the valve bore 102 register with the ports 252a and 252b of the sleeve 252, respectively. This permits an oil pressure in the oil conduit 410 acting on a differential area between the lands 203a and 203b of the spool 203 and an oil pressure in the oil conduit 411 to act on the bottom end of the land 203b, creating the above mentioned upward force with which the spool 203 urges the spool 202 upward. Therefore, the line pressure is regulated in response to the oil pressure in the oil conduit 410 and that in the oil conduit 411.

Referring to FIG. 2(c), the manual valve 4 comprises a valve bore 104 formed with six ports 104a to 104f and a spool 204 having formed thereon two lands 204a and 204b slidably disposed in the valve bore 104. The spool 204 is actuated by a shift lever disposed near a driver's seat, both not being illustrated, and is movable between six detent positions, i.e., a parking position "P", a reverse drive position "R", a neutral position "N", a forward automatic drive position "D", a manual second position "II", and a manual first position "I". The port 104a is a drain port, while the port 104b is connected via an oil conduit 408 with the clutch C1 at a fluid operated actuator therein, not shown, and also with a port 502a of a shuttle valve 502. The port 104c is connected with the before mentioned oil conduit 402 serving as the line pressure circuit. The port 104d is connected via an oil conduit 412 with a port 120g of the 1-2 shift valve 20, and the governor valve 18. The port 104e is connected via an oil conduit 414 with a port 116e of the line pressure booster valve 16, a port 122a of the 2-3 shift valve 22 and a port 504a of a shuttle valve 504, both being shown in FIG. 2(b). The port 104f is connected via an oil conduit 416 with a port 134d of the manual first range pressure reducing valve 34. As shown in the following Table, the port 104c which is supplied with the line pressure is allowed to communicate with a port or ports indicated by the sign "o" in response to a position selected by the spool 204. The other port or ports which are not indicated by the sign "o" are drained.

TABLE

| Spool Range | Port | | | |
| --- | --- | --- | --- | --- |
| | 104b | 104d | 104e | 104f |
| P | | | | |
| R | o | | | |
| N | | | | |
| D | | o | | |
| II | | o | o | |

TABLE-continued

| Spool Range | Port | | | |
| --- | --- | --- | --- | --- |
| | 104b | 104d | 104e | 104f |
| I | | o | o | o |

Referring to FIG. 2(c), the throttle valve 6 comprises a valve bore 106 formed with six ports 106a to 106f and a spool 206 having formed thereon three lands 206a to 206c slidably disposed in the valve bore 106. A spring 306 is disposed in the valve bore 106 to bias the spool 206 leftward as viewed in FIG. 2(c). Also slidably disposed in the valve bore 106 is a plunger 207 operatively connected, via a linkage as shown in FIG. 4 with an accelerator pedal. Between the plunger 207 and the spool 206 is arranged a spring 307. The land 206c is smaller in diameter than the other two lands 206a and 206b. The ports 106a and 106f are drain ports. The port 106b is connected with an oil conduit 418, i.e., a kickdown pressure circuit, to receive a kickdown pressure (the same pressure as the line pressure) only when the accelerator pedal is depressed to a kickdown position thereof which will be described later. When the accelerator pedal is in the other positions, this port 106b is connected with the drain port 106a. The ports 106c and 106e are connected with an oil conduit 420, i.e., a throttle pressure circuit, and the port 106d is connected with the oil conduit 402, serving as the line pressure circuit. An orifice 610 is provided in the inlet to the port 106e.

With the throttle valve 6 thus constructed, an oil pressure in the ports 106c and 106e is obtained after a well known pressure regulation is carried out using the line pressure in the port 106d as a source of pressure until the sum of a leftward force by the spring 306 and a leftward force created by the oil pressure in the port 106e acting on the differential area between the lands 206b and 206c balances with a rightward force by the spring 307. Thus, the oil pressure proportional to the bias force of the spring 307 builds up in the oil conduit 420. However, since the bias force of the spring 307 is varied by the plunger 207 operated by the accelerator pedal, the oil pressure, i.e., a throttle pressure, in the oil conduit 420 is proportional to the depression degree of the accelerator pedal or the throttle opening degree of the throttle valve mounted in an intake passage of the engine. Under kickdown condition, the throttle valve 6 is pushed inwardly by the plunger 207 via the spring 307 to the right as viewed in FIG. 2(c) to a limit position indicated by the upper half thereof so that it ceases its pressure regulating function. Under this condition, the line pressure is supplied also to the oil conduit 420 and past a port 108e to the oil conduit 418 and to the port 106b which serves as a drain port.

The throttle fail safe valve 8 comprises a valve bore 108 connected with and formed coaxially with the valve bore 106 of the throttle valve 6. The valve bore 108 is formed with five ports 108a to 108e and slidably receives therein a sleeve 208 having formed thereon three lands 208a to 208c. The throttle fail safe valve 8 also comprises the before mentioned plunger 207, the land 207a of which is slidably disposed in the sleeve 208 for axial movement, a plug ring 209 closing a space between the plunger 207 and the valve bore 108, and a spring 308 arranged between the plug ring 209 and the sleeve 208. The plug ring 209 is formed with an aperture which allows the plunger 207 to pass through. The ports 108a and 108d of the valve bore 108 are connected with the oil conduit 420 which serves as the throttle pressure circuit, and the port 108b is connected with the oil conduit 402 which serves as the line pressure circuit. The port 108c is connected via the oil conduit 422 with a port 506a of a shuttle valve 506. The port 108e is connected with the oil conduit 418, i.e., the before mentioned kickdown circuit.

The throttle fail safe valve 8 thus constructed functions to alleviate the force required to push the plunger 207 inwardly, so the accelerator pedal is prevented from being excessively loaded by the spring 307 when the pedal is depressed. The throttle pressure supplied to the port 108a enters into the inside of the sleeve 208, acting on the land 207a of the plunger 207, thus applying to the plunger 207 the rightward force which assists the depressing movement of the plunger 207. Thus, the force required to push the plunger 207 by compressing the spring 307 is alleviated, alleviating the depressing force of the accelerator pedal. Irrespective of the fact that the reaction force of the spring 307 increases as the spring 307 is compressed, substantially constant accelerator pedal depression effort is provided because the throttle pressure increases as the spring 307 is compressed and the force derived from the throttle pressure to push the plunger 207 also increases. Under the kickdown condition, the plunger 207 is pushed inwardly to the position illustrated by the upper half thereof as viewed in FIG. 2(c), allowing port 108e to communicate with the port 108a via the inside of the sleeve 208, thus allowing the oil pressure in the oil conduit 420 to be supplied to the oil conduit 418. Because, under the kickdown condition, the spool 206 of the throttle valve 6 is also pushed inwardly to the position illustrated by the upper half position thereof wherein the port 106d is allowed to communicate with the port 106c, the oil conduit 420 which normally serves as the throttle pressure circuit and has been supplied with the throttle pressure, is now supplied with the line pressure. Consequently, the line pressure develops also in the oil conduit 418. Since the sleeve 208 is biased by the spring 308 to stay in the rightward limit position thereof as illustrated by the upper half position thereof wherein ports 108c and 108d are allowed to communicate with each other via a groove between the lands 208a and 208b of the sleeve 208, the oil pressure in the oil conduit 420 is admitted to the oil conduit 422. Normally, the throttle pressure develops in the oil conduit, but the line pressure develops under the kickdown condition. If a throttle valve operating cable interconnecting the accelerator pedal with the plunger 207 should be disconnected or broken out, the plunger 207 would be pulled outwardly by a return spring, not shown, to move leftwardly as viewed in FIG. 2(c). This leftward movement of the plunger 207 causes the sleeve 208 to move to the position indicated by the lower half thereof as viewed in FIG. 2(c). Thus, the port 108b communicates with the port 108c, supplying the line pressure to the oil conduit 422 from the oil conduit 402, causing the line pressure to rise to a peak value thereof. Therefore, the transmission is prevented from becoming burned or damaged due to low line pressure in the event the throttle valve operating cable is disconnected or broken out. The automotive vehicle is therefore enabled to travel (such as to a repair shop) without causing a slip in clutches and brakes. The throttle valve operating mechanism employed here is disclosed and illustrated in FIG. 4 of U.S. Pat. No. 4,301,697 issued on Nov. 24, 1981 to Kazuyoshi IWANAGA et al. and assigned to Nissan Motor Company, Limited.

Referring to FIG. 2(c), the throttle modulator valve 10 comprises a valve bore 110 formed with five ports 110a to 110e, a spool 210 having formed thereon three lands 210a to 210c slidably disposed in the valve bore 110, and a spring 310 biasing the spool 210 leftwardly as viewed in FIG. 2(c). The land 210a is larger in diameter than the diameter of the lands 210b and 210c. The ports 110a and 110d are connected with the oil conduit 420 which serves as the throttle pressure circuit, while the port 110b is connected with the oil conduit 418 which serves as the kickdown circuit. The ports 110c and 110e are connected via an oil conduit 424 with a port 122d of the 2-3 shift valve 22 shown in FIG. 2(b). The port 110e is provided with an orifice 612 at an inlet thereof.

With the throttle modulator valve 10 thus constructed, since, when not under the kickdown condition, the port 110b is a drain port via an oil conduit 418, a pressure regulation is effected with the port 110d (which is supplied with the throttle pressure) as a high pressure side port and the port 110b as a drain port. The equilibrium state of the spool 210 is accomplished when a rightwardly directed force due to the oil pressure (throttle pressure) in the port 110a acting on the land 210a balances with the sum of a leftwardly directed force derived from an oil pressure in the port 110e acting upon the land 210c and a leftwardly directed force due to the spring 310. Therefore, the oil pressure in the port 110e (this oil pressure hereinafter being called as "throttle modulator pressure") varies depending upon the throttle pressure. This throttle modulator pressure is supplied via the above mentioned oil conduit 424 to the 2-3 shift valve 22. Under the kickdown condition, the port 110b which has been a drain port is supplied with the kickdown pressure (line pressure) and thus the throttle modulator valve 10 is moved to the upper half indicating position and ceases its pressure regulating function, allowing the line pressure to appear in the oil conduit 424.

The pressure modifier valve 12 comprises a valve bore 112 formed with five ports 112a to 112e, a spool 212 having formed thereon the same diameter lands 212a and 212b slidably disposed in the valve 112, and a spring 312 which biases the spool 212 downward as viewed in FIG. 2(c). The ports 112a and 112b are both drain ports. The ports 112c and 112e are connected via the above mentioned oil conduit 411 with the port 102i of the regulator valve 2, while the port 112d is connected via the oil conduit 426 with a port 506c of a shuttle valve 506. The port 112e is provided with an orifice 622 at an inlet thereof.

With the pressure modifier valve 12 thus constructed, a pressure regulating function is effected with the port 112d (which is supplied with the throttle pressure or the line pressure as will be later described) as a high pressure port and with the port 112b as a drain port. The equilibrium state of the spool 212 is accomplished when an upward force, as viewed in FIG. 2(c), derived from an oil pressure in the port 112e acting on the land 212b balances with a downward force due to the spring 312. Thus, the oil pressure in the port 112e (this pressure being hereinafter called as "pressure modifier pressure") has a constant value which is determined by the force of the spring 312. However, when the oil pressure supplied to the port 112d is low so that the upward force does not overcome the force by the spring 312, the pressure modifier valve 12 stays in the right half position thereof wherein the pressure regulating function is not effected, admitting the oil pressure in the port 112d to the oil conduit 411. Thus, the oil pressure in the oil conduit 411 becomes equal to the oil pressure in the oil conduit 426. Normally i.e., when the throttle valve operating cable is not disconnected or broken out nor when the manual valve 4 is not placed in the "II" position, the throttle pressure is supplied via the port 108c of the throttle fail safe valve 8, the oil conduit 422, the shuttle valve 506 and the oil conduit 426 to the port 112d, thus providing the pressure modifier pressure. If the throttle valve operating cable should be disconnected or broken out, the throttle fail safe valve 8 operates in the manner described before, allowing the line pressure to be supplied to the oil conduit 422, thus keeping the pressure modifier pressure constant. As will be later described, if the manual valve 4 is set from the "D" position to the "II" position, since the line pressure is supplied from the line pressure booster valve 16 via the oil conduit 428 to the port 506b of the shuttle valve 506, the line pressure is supplied to the port 112d irrespective of the value of the throttle pressure within the oil conduit 422, thus allowing the pressure modifier pressure to increase to the constant peak value. Since the pressure modifier pressure is introduced to the port 102i of the regulator valve 2 via the oil conduit 411, the line pressure increases in accordance with the magnitude of the pressure modifier pressure. The pressure modifier pressure is fed also to the cut back valve 14.

The cut back valve 14 comprises a valve bore 114 formed with seven ports 114a to 114g and a spool 256 having formed thereon three lands 214a to 214c slidably disposed in the valve bore 114. It also comprises a sleeve 256 formed with ports 256a and 256b in registry respectively with the ports 114f and 114g, and a spool 215 having formed thereon two lands 215a and 215b slidably disposed in the sleeve 256. The land 214a of the spool 214 is smaller in diameter than the lands 214b and 241c. The land 215a of the spool 215 is larger in diameter than the land 215b. The ports 114a and 114d are connected with the oil conduit 411 and are supplied with the before mentioned pressure modifier pressure. The port 114b is a drain port. The ports 114c and 114g are connected with an oil conduit 410, the port 114e is connected with the oil conduit 428, and the port 114f is connected with an oil conduit 430 which serves as a governor pressure circuit. The port 114g is provided with an orifice 614 at an inlet thereof.

The cut back valve 14 thus constructed performs a pressure regulating function with the port 114d as a high pressure port and with the port 114b as a drain port when the manual valve 4 is not placed in the "II" position or the line pressure booster valve 16 is in the upper half indicating position thereof as viewed in FIG. 2(c) (i.e., when the oil conduit 428 is a drain oil conduit). Under this condition, the spools 214 and 215 move as if they were one piece and assume an equilibrium state when a rightwardly directed force derived from the pressure modifier pressure in the port 114a acting on the land 214a balances with the sum of a leftwardly directed force derived from an oil pressure in the port 114a acting on the land 215b and a leftwardly directed force derived from an oil pressure (governor pressure) in the port 114f acting on a differential area between the lands 215a and 215b. As the governor pressure rises, the oil pressure in the port 114g (which oil pressure is hereinafter called as "cut back pressure") drops and when the governor pressure rises further beyond a predetermined value, the cut back valve 14 is moved to the lower half position thereof as viewed in FIG. 2(c), reducing the cut back pressure to zero. The cut back pressure drops as the pressure modifier pressure drops. Since the cut back pressure is introduced to the port 102h of the regulator valve 2 via the oil conduit 410, the line pressure drops as the governor pressure rises and it drops as the pressure modifier pressure drops. If the manual valve 4 is set from the "D" position to the "II" position, the line pressure is supplied to the port 114e of the cut back valve 14 via the oil conduit 428, thus urging the spool 214 to move to the leftward limit position as viewed in FIG. 2(c). Consequently, the port 114c is allowed to communicate with the port 114b which is a drain port, so the oil pressure in the oil conduit 410 drops to zero irrespective of the value of the governor pressure nor that of the pressure modifier pressure.

The line pressure booster valve 16 comprises a valve bore 116 formed with six ports 116a to 116f, a spool having formed thereon three lands 216a to 216c slidably disposed in the valve bore 116, and a spring 316 biasing the spool 216 leftwardly as viewed in FIG. 2(c). The lands 126a to 216c are of the same diameter land. The spool 216 is formed with a bore 216d which communicates with a groove between the lands 216a and 216b with the left end of the spool 216. The ports 116c and 116f are drain ports. The port 116d is connected with the oil conduit 428, and the port 116e is connected with the oil conduit 414. The port 116b is connected via the oil conduit 432 with a port 120h of the 1-2 shift valve 20 shown in FIG. 2(b), which port 120h is adapted to be supplied with the line pressure when the 1-2 shift valve 20 assumes the second speed ratio position (an upshift position thereof). The port 116a is connected via an oil conduit 434 with a port 122g of the 2-3, shift valve 22, which port 122g is adapted to be supplied with the line pressure when the 2-3 shift valve 22 is in the third speed ratio position (an upshift position thereof). The line pressure booster valve 16 thus constructed operates in a different manner in a case where the 2-3 shift valve 22 is shifted from the second speed ratio position (the downshift position thereof) to the third speed ratio position (the upshift position thereof) from a case wherein it is shifted from the third speed ratio position to the second speed ratio position. That is, when the 1-2 shift valve 20 assumes the first speed ratio position or the second speed ratio position, the spool 216 of the line pressure booster valve 16 stays in the upper half indicating position thereof as viewed in FIG. 2(c) by the action of the spring 316. When the 1-2 shift valve 20 assumes the second speed ratio position, the line pressure is supplied to the port 116b. This, however, does not cause the line pressure booster valve 16 to shift its position because the land 216b covers the port 116b. In this state, the port 116d communicates with the drain port 116c. When, subsequently, the 2-3 shift valve 22 is shifted to the third speed ratio position, the line pressure is supplied to the oil conduit 434. The line pressure in the oil conduit 434 passes through the port 116a and the bore 216d of the spool 216 to act on the left end face of the spool 216, urging the spool 216 to move against the spring 316 rightwardly to the lower half indicating position as viewed in FIG. 2(c). In this position of the spool 216, the port 116b is allowed to communicate with the bore 216d of the spool 216, while the port 116a is closed by the land 216a, so that the pressure in the oil conduit 432 now acts on the left end face of the spool 216. Thus, the line pressure booster valve 16 stays in the lower half position thereof even after the 2-3 shift valve 22 subsequently returns to the second speed ratio position thereof. Even if the line pressure booster valve 16 is shifted to the lower half indicating position, the oil conduit 428 continues to be drained via the port 116d, port 116e and oil conduit 414 to the port 104e as long as the manual valve 4 is not set in the "II" nor "I" position wherein the port 104e of the manual valve 4 serves as a drain port. However, when the manual valve 4 is set in the "II" or "I" position, since the line pressure is supplied to the oil conduit 414, the line pressure is supplied via the ports 116e and 116d to the oil conduit 428. The line pressure in the oil conduit 428 is supplied via the shuttle valve 506 to the port 112d of the pressure modifier valve 12, rendering the pressure modifier valve 12 to boost the line pressure. Therefore, if the manual valve 4 is set to the "II" position or "I" position while the vehicle is travelling in the third speed ratio in order to effect a forced downshift to the second speed ratio to obtain effective engine braking, the line pressure is boosted high enough to provide the swift downshift and effective engine braking. The boosting of the line pressure ceases when the 1-2 shift valve 20 is shifted to the first speed ratio position because the oil pressure in the oil conduit 432 disappears and the line pressure booster valve 16 returns to the upper half indicating position. The governor valve 18 is installed to rotate with the ouput shaft O of the automatic transmission and effects pressure regulation using the line pressure (i.e., the line pressure being fed to the governor valve 18 when the manual valve 4 is set in the "D" position, "II" position or "I" position) so as to provide an oil pressure (governor pressure) variable with the vehicle speed.

Referring to FIG. 2(b), the 1-2 shift valve 20 comprises a valve bore 120 formed with eleven ports 120a to 120k, two spools 220 and 221 slidably disposed in the valve bore 120, and a spring 320 biasing the spool 220 downward as viewed in FIG. 2(b). The spool 220 is formed with three lands 220a to 220c which are larger in diameter in this sequence, while the spool 221 is formed with lands 221a to 221d (the lands 221a to 221c are the same in diameter, but the land 221d is larger in diameter than the former three). The ports 120a, 120f and 120i are drain ports. The port 120b is connected with the oil conduit 418 serving as the kickdown pressure circuit. The port 120b is arranged such that the oil pressure therein acts on a differential area between the lands 220a and 220b when the spool 220 assumes the down position thereof indicated by the right half position thereof as viewed in FIG. 2(b), urging the spool 200 downward, and it acts on a differential area between the lands 220a and 220c when the spool 220 assumes the up position thereof indicated by the left half position thereof as viewed in FIG. 2(b), urging the spool 200 downward. The port 120c is connected with the oil conduit 420 serving as the throttle pressure circuit. The port 120c is arranged such that the oil pressure therein acts on a differential area between the lands 220b and 220c when the spool 220 assumes the down position thereof so as to urge the spool 220 downward, but no downward force is provided when the spool 220 assumes the up position thereof because the oil pressure acts on the circumference of the land 220c. The ports 120j and 120k are connected with the oil conduit 430 which serves as the governor pressure circuit. These ports are arranged such that the governor pressure acts on an area (which is equal to the area of the land 221c) resulting from subtracting a differential area between the lands 221d and 221c from the area of the land 221d when the spool 221 assumes the downshift position thereof, urging the spool 221 upwardly, and acts on the area of the land 221d when the spool 221 assumes the upshift position thereof, urging the spool 221 upward. The port 120g which is connected with the oil conduit 412 is closed by the land 221b when the spool 221 assumes the downshift position thereof, while it communicates via the port 120h with the oil conduit 432 when the spool 221 assumes the upshift position thereof. The oil conduit 432 is connected with the servo apply chamber S/A of the brake B2 shown in FIG. 2(a). The port 120d is connected via the oil conduit 436 with the port 502c of the shuttle valve 502 shown in FIG. 2(c). The port 102d is adapted to communicate with the port 120e when the spool 221 assumes the downshift position thereof. The port 120e is connected via an oil conduit 438 with the brake B1 shown in FIG. 2(a). With the 1-2 shift valve 20 thus constructed, the supply of the pressurized oil to the servo apply chamber S/A and the brake B1 is controlled depending upon the downshift position of the spool 221 or upshift position thereof.

The 2-3 shift valve 22 comprises a valve bore 122 formed with twelve ports 122a to 122l, a spool 222 having formed thereon five lands 222a to 222e slidably disposed in the valve bore 122, a plug 823 axially slidable near the closed end in the valve bore 122, and a spring 322 arranged between the spool 222 and the plug 823. The lands 222a to 222c are larger in diameter in this sequence, the land 222c is the same in diameter as the land 222d, and the land 222e is larger in diameter than the former two. The ports 122b and 122h are drain ports. The drain port 122h is provided with an orifice 670. The port 122a is connected with the oil conduit 414 (which is supplied with the line pressure when the manual valve 4 is set the "II" position or "I" position), and is arranged such that the oil pressure therein acts on the upper end face of the plug 823. The port 122c is connected with the oil conduit 418 serving as the kickdown pressure circuit and is arranged such that the oil pressure in the port 122c acts on a differential area between the lands 222a and 222b of the spool 222, urging the spool 222 downward as viewed in FIG. 2(b). The port 122d is supplied with a throttle modulator pressure from the oil conduit 424 and is arranged such that the throttle modulator pressure acts on a differential area between the lands 222b and 222c when the spool 222 assumes the upshift position thereof, urging the spool 222 downward as viewed in FIG. 2(b). The port 122e is supplied with a throttle pressure from the oil conduit 420 and is arranged such that the throttle pressure acts on a differential area between the lands 222b and 222c of the spool 222 when the spool 222 assumes a downshift position thereof, urging the spool 222 downward. The ports 122i and 122j are supplied with the governor pressure from the oil conduit 430, and they are arranged such that the governor pressure acts on an area (i.e., the area of the land 222d) resulting from subtracting a differential area between the lands 222e and 222d from the area of the land 222e when the spool 222 assumes the downshift position thereof, urging the spool 222 upward, while it acts on the area of the land 222e when the spool 222 assumes the upshift position thereof, urging the spool 222 upward. The port 122f provided with an orifice 616 at its inlet is connected with the oil conduit 432, and the port 122g is connected with the oil conduit 434. The port 122g is allowed to communicate with the drain port 122h when the spool 222 assumes the downshift position thereof, while it is allowed to communicate with the port 122f when the spool 222 assumes the upshift position thereof. The oil conduit 434 is connected with the clutch C2 shown in FIG. 2(a). With the 2-3 shift valve 22 thus constructed, the supply of pressurized oil to the clutch C2 is controlled depending upon the downshift or upshift position of the spool 222.

The plug 823 is formed with a groove 823a which serves as a transfer passage between the ports 122k and 122l, serving as transfer ports. The transfer ports 122k and 122l are allowed to communicate with each other when the plug 823 assumes an up position thereof as indicated by the left half thereof as viewed in FIG. 2(b), but the flow communication between these ports 122k and 122l is closed when the plug 823 assumes a down position thereof as indicated by the right half thereof as viewed in FIG. 2(b). Therefore, the plug 223 serves as a means for establishing comunication between the ports 122k and 122l when the 2-3 shift valve 22 assumes the upshift position thereof. The plug 823 normally stays in the up position thereof, but if assumes the down position thereof when the line pressure is applied to the port 122a of the 2-3 shift valve 22 when the manual valve is set to to "II" position or "I" position while travelling in "D" range.

Figure 2D:
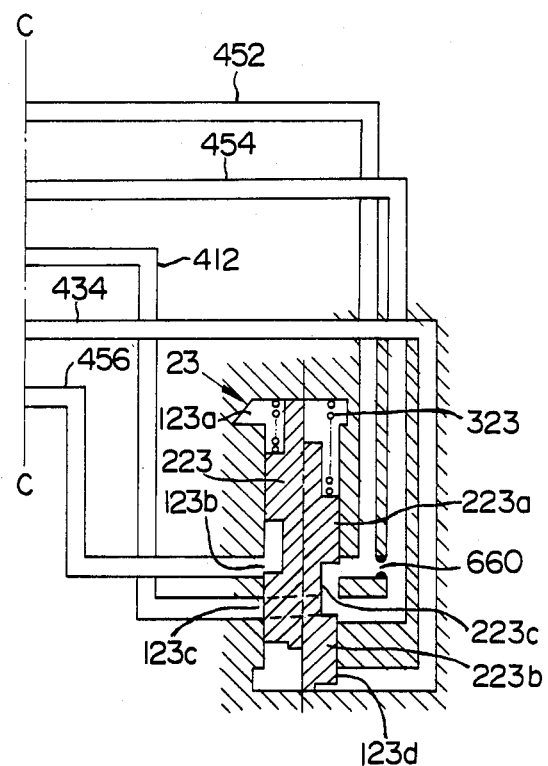

The 3-4 shift valve 24 comprises a valve bore 124 formed with eleven ports 124a to 124k, a spool 224 having formed thereon four lands 224a to 224d slidably disposed in the valve bore 124, a plug 225 axially slidable in the valve bore 124 near the closed end thereof, and a spring 324 arranged between the spool 224 and the plug 225. The lands 224a to 224c are the same in diameter and the land 224d is larger in diameter than the former lands. The port 124a is connected with the oil conduit 420 which serves as the throttle pressure circuit and is arranged such that the oil pressure in the port 124a acts on the end face of the plug 225 so as to urge the plug 225 downward as viewed in FIG. 2(b). The port 124b is connected via an oil conduit 440 with a port 508c of a shuttle valve 508. The oil pressure in this port 124b always acts on the upper side of the land 224a so as to urge the spool 224 downwardly. The port 124c is connected via an oil conduit 442 with the clutch C3 shown in FIG. 2(a). This port 124c is allowed to communicate with the port 124d which is connected via the oil conduit 444 with the servo release chamber S/R of the brake B2 shown in FIG. 2(a) when the spool 224 assumes the upshift position thereof. When the spool 224 assumes the downshift position thereof, the port 124d communicates with the port 124e which is connected via the oil conduit 434 with the clutch C2. The port 124f is connected via an oil conduit 446 with a port 126d of the 2-4 timing valve 26, while the port 124g is connected via the oil conduit 442 with the clutch C3. The port 124g is allowed to communicate with the port 124f when the spool 224 assumes the upshift position thereof. The port 124g, on other hand, is allowed to communicate with the port 124h when the spool 224 assumes the downshift position thereof. This port 124h is connected via an oil conduit 456, a port 123c of the 4-2 timing valve, an orifice device 660 and a port 123b of the 4-2 timing valve 23 as shown in FIG. 2(d), with the oil conduit 412 leading from the port 104d of the manual valve 4, the oil conduit 412 being supplied with the line pressure when the manual valve 4 is set in "D" or "II" or "I" position. The port 124i is a drain port. The ports 124j and 124k are connected with the oil conduit 430 whicn serves as the governor pressure circuit. Similarly to the before mentioned 1-2 shift valve 20 and 2-3 shift valve 22, the ports 124j and 124k are arranged such that the governor pressure acts on the area of the land 224c when the spool 224 is in the downshift position thereof, urging the spool 224 upward, while when the spool 224 is in the upshift position thereof, the governor pressure acts on the area of the land 224d, urging the spool 224 upward. With the 3-4 shift valve 24 thus constructed, the supply of pressurized oil to the clutch C3 and the servo release chamber S/R is controlled depending upon the downshift position or upshift position of the spool 224.

The 2-4 timing valve 26 comprises a valve bore 126 formed with six ports 126a to 126f and a spool 226 having formed thereon three lands 226a to 226c slidably disposed in the valve bore 126. The lands 226b and 226c are the same in diameter, and the land 226a is smaller in diameter than the former two. The ports 126a, 126c and 126e are drain ports, respectively. The port 126e is provided with an orifice 602. An orifice 618 is provided in an oil conduit 446. The port 126b is supplied with the throttle pressure from the oil conduit 420 which serve as the throttle pressure circuit and is arranged such that the throttle pressure in the port 126b always acts on a differential area between the lands 226a and 226b so as to always urge the spool 226 downward. The port 126d is connected with the oil conduit 446 and is allowed to communicate with the port 126e when the spool 226 is in the down position thereof, but is allowed to communicate with the port 126c when the spool 226 is in the up position thereof. The port 126f is connected via the oil conduit 434 with the clutch C2. With the 2-4 timing valve 26 thus constructed, the pressurized oil is supplied to the clutch C2 and the pressurized oil from the clutch C3 is discharged at proper timing during 2-4 shifting further detail being described later.

Referring to FIG. 2(a), the 2-3 timing valve 28 comprises a valve bore 128 formed with five ports 128a to 128e, a spool 228 having formed thereon three lands 228a to 228c slidably disposed in the valve bore 128, and a spring 328 biasing the spool 228 upwardly as viewed in FIG. 2(a). The port 128a is supplied with the governor pressure from the oil conduit 430 so as to urge the spool 228 downward. Against this downward force, the throttle pressure is supplied to the port 128e from the oil conduit 420 so as to urge the spool 228 upward. The port 128b is a drain port. The port 128c is connected with a portion of the oil conduit 434 upstream of the check valve 750 and an orifice 650, i.e., a portion disposed on the side near the 2-3 shift valve 22. The port 128d is connected with a portion of the oil conduit 434 downstream of the check valve 750 and the orifice 650, i.e., a portion on the side near the clutch C2. The check valve 750 and the orifice 650 are arranged in parallel. With the 2-3 timing valve 28 thus constructed, the pressurized oil to be supplied to the clutch C2 is controlled depending upon the magnitude of the throttle pressure and that of the governor pressure so that the clutch C2 is engaged at proper timing during 2-3 shifting.

The 3-4 timing valve 30 comprises a valve bore 130 formed with five ports 130a to 130e, a spool 230 having formed thereon three lands 230a to 230c slidably disposed in the valve bore 130, and a spring 330 biasing the spool 230 upward as viewed in FIG. 2(a). The port 130a is supplied with the governor pressure from the oil conduit 430 so as to urge the spool 230 downward. Against this downward force, the throttle pressure is supplied to the port 130e from the oil conduit 420 so as to urge the spool 230 upward. The port 130b is a drain port. The ports 130c and 130d are both connected with the oil conduit 442. The port 130c is connected with a portion of the oil conduit 442 upstream of a check valve 752 and an orifice 652, i.e., a portion disposed on the side near the port 124c of the 3-4 shift valve 22, while the port 130d is connected with the downstream portion which is disposed on the side near the clutch C3. The check valve 752 and the orifice 652 are arranged in parallel. With the 3-4 timing valve 30 thus constructed, the pressurized oil to be discharged from the clutch C3 is controlled depending upon the magnitude of the throttle pressure and that of the governor pressure so as to release the clutch C3 in proper timing during 3-4 shifting.

The 3-2 timing valve 32 comprises a valve bore 132 formed with five ports 132a to 132e, a spool 232 having formed thereon three lands 232a to 232c slidably disposed in the valve bore 132, and a spring 332 biasing the spool 232 upward as viewed in FIG. 2(a). The port 132a is supplied with the governor pressure from the oil conduit 430 so as to urge the spool 232 downward. Against this downward force, the throttle pressure is supplied to the port 132e from the oil conduit 420 so as to urge the spool 230 upward. The port 132b is a drain port. The ports 132c and 132d are both connected with the oil conduit 434. The port 132c is connected with a portion of the oil conduit 434 upstream of a check valve 754 and an orifice 654, i.e., a portion disposed on the side directly connected with the port 122g of the 2-3 shift valve 22, while, the port 132d is connected with a portion downstream of the oil conduit 434, i.e., a portion disposed on the side directly connected with the port 124e of the 2-3 shift valve 24. The check valve 754 and the orifice 654 are arranged in parallel. With the 3-2 timing valve 32 thus constructed, the pressurized oil to be discharged from the clutch C2 is controlled depending upon the magnitude of the throttle pressure and that of the governor pressure so as to release the clutch C2 at proper timing during 3-2 shifting.

Referring to FIG. 2(d), the 4-2 timing valve 23 comprises a valve bore 123 formed with four ports 123a to 123d, a spool 223 having formed thereon two lands 223a and 223b slidably disposed in the valve bore 123, and a spring 323 biasing the spool 223 downward as viewed in FIG. 2(d). The port 123a is a drain port. The port 123b is connected with the oil conduit 456 leading to the port 124h of the 3-4 shift valve 24. The port 123c is connected with the oil conduit 412 leading from the port 104d of the manual valve 4. As shown in FIG. 2(d), an orifice device 660 is provided in a fluid supply passage 412, 456 to restrict fluid flow therethrough. In other words, the ports 123b and 123c are connected with each other via the orifice device 660. Thus, the orifice oil conduits 412 and 456 are always connected with each other via the orifice device irrespective of the position of the spool 223. The port 123d is connected with the oil conduit 434 leading from the port 122g of the 2-3 shift valve 22. The oil conduit 434 is supplied with the line pressure when the spool 222 of the 2-3 shift valve 22 assumes the upshift position thereof, i.e., when the third or fourth speed ratio is to be established. When the oil pressure in the port 123d is higher than a predetermined value, the spool 223 assumes an up position thereof as indicated by the left half thereof as viewed in FIG. 2(d). When the spool 223 assumes the up position thereof, the oil flows from the oil conduit 412 to the oil conduit 456 via the orifice device 660 since the land 223b prevents flow communication between the ports 123b and 123c. When the oil pressure in the port 123d drops and becomes lower than the predetermined value, the spring 323 urges the spool 223 to assume a down position thereof as indicated by the right half thereof as viewed in FIG. 2(d). In this down position, the port 123b is allowed to communicate with the port 123c bypassing the orifice device 660 via a groove 223c defined between the two lands 223a and 223b, thus providing a bypass passage bypassing the orifice device 660. As shown in FIG. 2(d), the orifice device 660 is bypassed also by another bypass passage via an oil conduit 454 and an oil conduit 452 which are connected with the transfer ports 122k and 122l of the 2-3 shift valve 22, respectively. This bypass passage is provided or established only when the plug 823 assumes the up position thereof and closed when the plug 823 assumes the down position thereof.

Referring to FIG. 2(c), the manual first range pressure reducing valve 34 comprises a valve bore 134 formed with five ports 134a to 134e, a spool 234 having formed thereon two lands 234a and 234b, and a spring 334 biasing the spool 234 downward. The ports 134a and 134b are drain ports. The port 134d is connected with the oil conduit 416 which is supplied with the line pressure when the manual valve 4 is in the "I" position, while the ports 134c and 134e are connected with the oil conduit 448. The port 134e is provided with an orifice 620 at an inlet thereof. With the manual first range pressure reducing valve 34, a pressure regulation is effected with the port 134b as a high pressure port and with the port 134b as a drain port until the oil pressure in the port 134e balances with the force of the spring 334. Thus, the manual first range pressure reducing valve 34 functions to produce a predetermined constant oil pressure in the oil conduit 448 which results from reducing the line pressure when the line pressure appears in the oil conduit 416.

Referring to FIG. 2(a), the torque converter pressure reducing valve 36 comprises a valve bore 136 formed with five ports 136a to 136e, a spool 236 having formed thereon two lands 236a and 236b, and a spring 336 biasing the spool 236 leftwardly as viewed in FIG. 2(a). The ports 136d and 136e are drain ports. The port 136b is connected with the oil conduit 406 which is supplied with pressurized oil discharged from the port 102f of the regulator valve 2, while the ports 136a and 136c are connected via the oil conduit 450 with the torque converter T/C. The port 136a is provided with an orifice 624 at an inlet thereof. With the torque converter pressure reducing valve 36 thus constructed, a pressure regulation is effected with the port 136b as a high pressure port and with the port 136b as a drain port until the force created by the oil pressure in the port 136a balances with the force of the spring 336. Therefore, the torque converter pressure reducing valve 36 functions to provide a constant pressurized pressure to the torque converter T/C irrespective of the variation in oil pressure in the oil conduit 406.

The 1-2 accumulator 38 comprises a stepped cylindrical bore 138, a piston 238 slidably disposed in the bore 138, and a spring 338 biasing the piston upwardly as viewed in FIG. 2(a). A chamber 138a defined by the larger diameter side of the piston 238 is connected with the oil conduit 432, a chamber 138b defined by the smaller diameter side of the piston 238 is connected with the oil conduit 402 (line pressure circuit), and an intermediate chamber 138c is a drain chamber. An orifice 656 and a check valve 756 are arranged in parallel at that portion of the oil conduit 432 which is disposed upstream of the 1-2 accumulator 38 and the servo apply chamber S/A. The 1-2 accumulator 38 thus constructed functions to allow a gradual rise in the oil pressure in the oil conduit 432 (i.e., the oil pressure in the servo apply chamber S/A) so as to effect a smooth 1-2 shifting.

The 4-3 accumulator 40 comprises a cylindrical bore 140, a piston 240 slidably disposed in the cylindrical bore 140, and a spring 340 biasing the piston 240 upward as viewed in FIG. 2(a). An upper side chamber 140a defined by the piston 240 is connected with the oil conduit 402 (the line pressure circuit), while the lower side chamber 140b is connected with the oil conduit 442 which communicates with the clutch C3. A check valve 758 and an orifice 658 are arranged in parallel at that portion of the oil conduit 442 which is disposed upstream of the clutch C3 and the 4-3 accumulator 40. The 4-3 accumulator 40 thus constructed functions to allow a gradual rise in the oil pressure in the oil conduit 442 (the oil pressure in the clutch C3) so as to effect a smooth 4-3 shifting and so as to alleviate shocks upon setting the manual valve 4 from the "N" position to the "D" position.

Referring to FIG. 2(a), the overdrive inhibitor solenoid 42 is provided to open or close an opening 409a formed in an oil conduit 409 which is connected at one end thereof with the oil conduit 402 serving as the line pressure circuit and it comprises a rod 42a arranged to close the opening 409a when the solenoid 42 is energized. The oil conduit 409 is connected with a port 504b of a shuttle valve 504. The overdrive inhibitor solenoid 42 is energized by the overdrive inhibitor switch SW operable from a driver's seat. When the switch SW is turned off, the oil flowing into the oil conduit 409 from the oil conduit 402 is discharged from the opening 409a, so no pressure develops in the oil conduit 409. As will be noted, since the area of the orifice 604 is small enough, the line pressure in the oil conduit 402 is not affected even if the oil is discharged from the opening 409a. When the switch SW is turned on and the rod 42a closes the opening 409a, the oil conduit 409 is subject to the same pressure, i.e., the line pressure, as that in the oil conduit 402. As a result, the 3-4 shift valve 24 is forced to assume the downshift position thereof, thus preventing an upshifting to the fourth speed ratio (overdrive).

The clutches C1, C3, and the servo apply chamber S/A are provided with orifices 626, 628 and 630 at inlets thereof, respectively.

Hereinafter, the operation of the hydraulic control system is described.

The operation of the manual valve 4 in each of the different positions is described.

When the manual valve 4 is set in the "N" position thereof, the line pressure is not supplied to none of the ports 104b, 104d, 104e and 104f, rendering them to serve as drain ports. Thus, no oil pressure is supplied to the clutches and brakes, putting the automatic transmission in the neutral state.

When the manual valve 4 is set from the "N" position to the "D" position, the line pressure is supplied to the port 104d from the port 104c, and this line pressure in the port 104d is supplied to the port 120g of the 1-2 shift valve 20 the port 124h of the governor valve 18, and the port 123c of the 4-2 timing valve 23. The governor valve 18 generates the before mentioned governor pressure variable with the vehicle speed using the line pressure and supplies the governor pressure via the oil conduit 430 to the shift valves 20, 22 and 24. When the vehicle speed is low, since the governor pressure is low, each of the shift valves 20, 22 and 24 stays in the downshift position thereof. Therefore, the line pressure is blocked at the port 120g of the 1-2 shift valve 20 which is closed by the land 221b. The line pressure arriving at the port 123c of the 4-2 timing valve 23 is supplied to the port 123b via the groove 223c bypassing the orifice device 660 since the spool 223 of the 4-2 timing valve 23 assumes the down position thereof. The line pressure is supplied from the port 123c to the port 123b via another bypass passage through the oil conduit 454, the ports 122l, 122k and the oil conduit 452 also. The line pressure is supplied from the port 123b to the port 124h of the 3-4 shift valve 24 and then to the clutch C3 via the port 124g and the oil conduit 442 since the spool 224 of the 3-4 shift valve 24 assumes the downshift position thereof. As described before, the engagement of the clutch C3 cooperates with the action of the one-way clutch OWC to establish the first forward speed ratio. Since the oil conduit 442 communicates with the chamber 140b of the 4-3 accumulator 40, the line pressure is supplied to the chamber 140b, allowing the piston 240 of the 4-3 accumulator 40 which has been pressed down by the line pressure supplied from the oil conduit 402 to move slowly in the upward direction in response to the action of the spring 340. This causes the oil pressure downstream of the orifice 658 in the oil conduit 442 to rise slowly, causing gradual engagement of the clutch C3, thus alleviating shocks (a select shock) upon setting the manual valve 4 from the "N" position to the "D" position.

When the governor pressure rises to a predetermined value as a result that the vehicle speed has increased after the automotive vehicle has started with the first speed ratio, the upward force due to the governor pressure acting on the spool 221 overcomes the sum of the downward force by the spring 320 and that due to the throttle pressure acting on the differential area between the lands 220b and 220c, thus allowing the spools 220 and 221 to begin to move upward from the downshift position thereof. Immediately after the spools 220 and 221 has begun to move upward, the land 221d of the spool 221 closes the port 120j at the same time the land 221c opens the drain port 120i, resulting in a rapid increase in the pressure acting area which the governor pressure acts on, allowing the spools 220 and 221 move to the illustrated left half position thereof in a moment. As a result, the port 120g is allowed to communicate with the port 120h, admitting the line pressure to the oil conduit 432. The line pressure in the oil conduit 432 is supplied via the orifices 656 and 630 to the servo apply chamber S/A. Thus, the brake B2 is engaged and cooperates with the clutch C3 which remains engaged to establish the second forward speed ratio. The line pressure in the oil conduit 432 is admitted to the chamber 138a of the 1-2 accumulator 38, pushing the piston 238 which has been pressed downwardly by the line pressure acting in the chamber 138b from the oil conduit 402 back in the upward direction. This causes the oil pressure in the downstream portion of the oil conduit 432 to rise gradually, causing the gradual engagement of the brake B2. Consequently, shocks (a shift shock) during shifting from the first speed ratio to the second speed ratio are alleviated.

When the governor pressure further rises up to another value, the upward force due to the governor pressure and acting on the spool 222 of the 2-3 shift valve 22 overcomes the sum of the downward force due to the spring 322 and that due to the throttle pressure acting on the differential area between the lands 222*b* and 222*c*, allowing the spool 222 to begin to move upward from the downshift position thereof. Immmediately after the spool 222 has begun to move upward, the land 222*e* closes the port 122*i*, at the same time the land 222*d* opens the drain port 122*h*, causing a rapid increase in the pressure acting area which the governor pressure acts on, and concurrently with this event, the throttle pressure from the port 122*e* acting on the differential area between the lands 222*b* and 222*c* is replaced by the relatively low throttle modulator pressure, resulting in a reduction in the downward force. Therefore, the spool 222 moves to the illustrated left half position thereof in a moment. Thus, the port 122*f* is allowed to communicate with the port 122*g*, admitting the line pressure in the oil conduit 432 to the oil conduit 434. Since the oil conduit 434 communicates with the clutch C2, the clutch C2 is engaged. The oil conduit 434 communicates with the port 124*e* of the 3-4 shift valve 24 which in turn communicates with the port 124*d* when the 3-4 shift valve 24 assumes the downshift position thereof, so that the line pressure is supplied also to the port 124*d*. Thus, through the oil conduit 444, the line pressure is supplied from the port 124*d* to the servo release chamber S/R of the brake B2, releasing the brake B2. Referring to the 4-2 timing valve 23, the spool 223 is urged upward by the line pressure is the oil conduit 434 against the spring 323, thus closing the bypass passage via the groove 223*c*. As a result, the clutch C2 is engaged and the brake B2 is released with the clutch C3 left engaged to establish the third forward speed ratio. If, during shifting from the second speed ratio to the third speed ratio, the engagement of the clutch C2 were not effected in the proper timing with the release of the brake B2, substantial shocks would take place or the engine would race. In order to provide the proper timing, the 2-3 timing valve 28 is arranged in the oil conduit 434 at a portion between the 2-3 shift valve 22 and the clutch C2. The spool 228 of the 2-3 timing valve 28 is moved to the illustrated right half position thereof or the left half position thereof viewing in FIG. 2(*a*) depending upon the magnitude of the downward force due to the governor pressure supplied to the port 128*a* and the magnitude of the sum of the upward force due to the spring 328 and that due to the throttle pressure supplied to the port 128*e*. That is, in an acceleration state when the accelerator pedal is depressed deeply, since the throttle pressure is high, the 2-3 timing valve 28 assumes the illustrated right half position thereof wherein the ports 128*c* and 128*d* are allowed to communicate with each other, the upstream portion of the oil conduit 434 near the port 122*g* of the 2-3 shift valve 22 is connected with the downstream portion of the oil conduit 434 near the clutch C2 bypassing the orifice 650, thus allowing the clutch C2 to engage swiftly. On the other hand, if the depression degree of the accelerator pedal is decreased, the throttle pressure drops to allow the 2-3 timing valve 28 to assume the illustrated left half position thereof, closing the communication between the ports 128*c* and 128*d*, providing the state wherein the upstream portion of the oil conduit 434 near the port 122*g* of the 2-3 shift valve 22 communicates with the downstream portion of the oil conduit 434 near the clutch C2 through the orifice 650. Thus, the oil pressure in the clutch C2 increases gradually, so the engagement of the clutch C2 is slightly delayed. During this delay, the engine revolution speed drops, so that the substantial shift shocks are alleviated. Hence, the 2-3 timing valve 28 functions to alleviate the shocks taking place during shifting from the second speed ratio to the third speed ratio while the vehicle is coasting. Midway in the oil conduit 434 extending from the port 122*g* of the 2-3 shift valve 22 to the port 124*e* of the 3-4 shift valve 24, the 3-2 timing valve 32, check valve 754 and orifice 654 are arranged in parallel, but since the the flow of oil from the port 122*g* toward the port 124*e* agrees with the direction of flow which is allowed by the check valve 754, the oil pressure is supplied to the servo release chamber S/R without being subject to any influence of the flow restriction irrespective of the positions assumed by the 3-2 timing valve 32.

When the governor pressure rises further to still another value as a result that the vehicle has increased its vehicle speed while travelling with the third speed ratio, the upward force due to the governor pressure acting on the spool 224 of the 3-4 shift valve 24 overcomes the downward force due to the throttle pressure from the port 124*a* acting on the upper end face of the plug 225, causing the spool 224 to begin to move upward from the downshift position thereof. When the throttle pressure is low, since the force of the spring 324 is strong, the plug 225 is pushed upward by the spring 324 so that the above mentioned downward force is provided by the constant force by the spring 324. Immediately after the spool 224 has begun to move upward, the land 224*d* of the spool 224 closes the port 124*j* at the same time the land 224*c* opens the drain port 124*j*, rapidly increasing the pressure acting area which the governor pressure acts on, urging the spool 224 to move upward to the illustrated left half position thereof in a moment. In this position of the spool 224, the port 124*d* connected with the servo release chamber S/R is allowed to communicate with the port 124*c* connected with the oil conduit 442, while the port 124*g* connected with the oil conduit 442 is allowed to communicate with the port 124*f*. Therefore, both the clutch C3 and servo release chamber S/R are allowed to communicate with the port 124*f*. The port 124*f* is connected via the oil conduit 446 with the port 126*d* of the 2-4 timing valve 26, but since when the 2-4 timing valve 26 is urged upward by the oil pressure acting thereon from the oil conduit 434 and assumes the illustrated right half position thereof, the port 126*d* communicates with the port 126*c* which is a drain port. As a result, the oil pressure in the clutch C3 and that in the servo release chamber S/R are both discharged, disengaging the clutch C3 and engaging the brake B2. Since the clutch C2 is engaged and the brake B2 is engaged, the fourth speed ratio is established. During the shift to the fourth speed ratio, since the oil from the clutch C3 flows through the check valve 758 in the forward direction thereof (the flow direction allowed by the check valve 758), the oil pressure in the clutch C3 is discharged swiftly. On the other hand, since the 3-4 timing valve 30, check valve 752 and orifice 652 are arranged in parallel in the midway in the oil conduit 442 extending from the port 124*c* to the port 124*g*, the speed at which the oil pressure is discharged from the servo release chamber S/R differs depending upon the positions assumed by the 3-4 timing valve 30. The 3-4 timing valve 30 is substantially the same in construction as the before mentioned 2-3 timing valve 28. During acceleration, the 3-4 timing valve 30 allows the port 124*c* of the 3-4 shift valve 24 to communicate with the port 124g of the 3-4 shift valve 24 bypassing the orifice 652, while in coasting operation it closes the communication between the ports 124c and 124g. Thus, in the latter case, the ports 124c and 124g are connected with each other through the orifice 652. As a result, in coasting operation the oil pressure in the servo release chamber S/R drops gradually and thus the engagement of the brake B2 is delayed as compared to the disengagement of the clutch C3. During the short period of this delay, the engine revolution speed drops, thus alleviating the shift shock.

The operation of the 2-4 timing valve 26 is described. If, while the vehicle is travelling with the second speed ratio, the throttle pressure is decreased rapidly, there are occasions when the 2-3 shift valve 22 and 3-4 shift valve 24 are shifted from their downshift positions to their upshift positions at the same time. This causes a shift from the second speed ratio directly to the fourth speed ratio. In this case, the clutch C3 is disengaged and the clutch C2 is engaged. For preventing the occurrence of the substantial shift shocks nor racing of the engine, it is necessary to disengage the clutch C3 in the proper timing with the engagement of the clutch C2. The oil pressure in the clutch C2 is increased by the oil supplied thereto from the 2-3 shift valve 22 via the oil conduit 434, and this oil pressure in the clutch C2 is also supplied to the port 126f of the 2-4 timing valve 26. The 2-4 timing valve 26 assumes the illustrated left half position thereof in the second speed ratio state because it is pressed down by the throttle pressure supplied to the port 126b. In this position of the 2-4 timing valve 26, the ports 126d and 126e are allowed to communicate with each other, so that the oil pressure in the clutch C3 is discharged via the oil conduit 442, the ports 124g and 124f of the 3-4 shift valve 24, the oil conduit 446, the ports 126d and 126e of the 2-4 timing valve 26, and the orifice 602. Therefore, the oil pressure in the clutch C3 is restricted by the orifice 602 and thus discharged gradually during the initial stage. When the oil pressure in the clutch C2 rises and exceeds a predetermined value, the 2-4 timing valve 26 is urged to move upward to the right half position thereof. When the 2-4 timing valve 26 assumes this position, the oil pressure in the clutch C3 which has been discharged via the port 126e begins to be discharged via the port 126c and thus is not influenced by the flow restriction by the orifice 602. Thus, the oil pressure in the clutch C3 drops rapidly. Since this permits the clutch C3 to be disengaged after the clutch C2 initiates its engagement, the occurrence of substantial shift shocks or engine racing is prevented. Since the predetermined value of the oil pressure in the clutch C2 at which the 2-4 timing valve 26 is shifted from the illustrated left half position thereof to the right half position thereof rises as the throttle pressure rises, the clutch C3 is disengaged early as the depression degree of the accelerator pedal decreases, thus providing a short period of time during which the neutral state is maintained. During this period of time, the engine revolution speed drops to a level corresponding to the current vehicle speed, thus alleviating the shift shocks.

Although, in the above description, the operation during upshifting between adjacent two speed ratios has been described, the downshifting between adjacent two speed ratios is hereinafter described.

When the governor pressure drops or the throttle pressure rises during travelling with the fourth speed ratio, the 3-4 shift valve 24 is shifted from the upshift position thereof to the downshift position thereof, admitting the line pressure in the oil conduit 456 to the clutch C3 via the oil conduit 442 so as to engage same, admitting the line pressure in the oil conduit 434 to the servo release chamber S/R so as to release the brake B2. As a result, the third speed ratio is established by the engagement of clutch C2 and that of the clutch C3. Owing to the function of the 4-3 accumulator 40, the oil pressure in the clutch C3 is allowed to increase gradually. That is, although in the fourth speed ratio state the piston 240 of the 4-3 accumulator 40 is pressed down by the line pressure the chamber 140a because the oil pressure in the chamber 140b is discharged via the oil conduit 442, the piston 240 is urged to move upward by the spring 340 as the oil pressure builds up in the oil conduit 442 after the 3-4 shift valve 24 has been shifted to the downshift position thereof. This upward movement of the piston 240 permits the oil pressure in the oil conduit 442 (i.e., the oil pressure in the clutch C3) to rise gradually. Since the clutch C3 is engaged during this gradual rise in the oil pressure, the clutch C3 is engaged with the appropriate bias force, thus avoiding substantial shift shocks.

When the governor pressure drops further or the throttle pressure rises further during travelling with the third speed ratio, the spool 222 of the 2-3 shift valve 22 is urged to move from the upshift position thereof to the downshift position thereof although the plug 223 stays in the position thereof, allowing the oil pressure in the oil conduit 434 to be discharged to the drain port 122b. Then, the oil pressure which has acted on the clutch C2 disappears and the clutch C2 is disengaged, while the brake B2 is engaged because the oil pressure in the servo release chamber S/R of the brake B2 is discharged via the oil conduit 444, ports 124d and 124e and the oil conduit 434. Therefore, the second speed ratio is established by the engagement of the clutch C3 and that of the brake B2. The discharge of the pressurized oil from the servo release chamber S/R is controlled by the 3-2 timing valve 32. That is, since the 3-2 timing valve 32, the check valve 54 and the orifice 654 are arranged in parallel in the midway in the oil conduit 434 extending from the port 124e of the 3-4 shift valve 24 and the port 122g of the 2-3 shift valve 22, the ports 124e and 122g are communicated with each other bypassing the orifice 654 when the 3-2 timing valve 32 assumes the illustrated left half position thereof, while when the 3-2 timing valve 32 assumes the illustrated right half position thereof, these ports 124e and 124g are allowed to communicate with each other via the orifice because the direct communication between them is closed. The 3-2 timing valve 32 assumes the illustrated left half position thereof when the force due to the throttle pressure acting on the port 132e is larger than the force due to the governor pressure acting on the port 132a (i.e., in acceleration state), while in the reverse case (i.e., in coasting state) the 3-2 timing valve 32 assumes the left half position thereof. Since, in acceleration state, the oil pressure in the servo release chamber S/R is discharged gradually through the orifice 654, the oil pressure in the servo release chamber S/R drops gradually. This causes a slight delay in the engagement of the brake B2 (the oil pressure in the clutch C2 is discharged quickly via the check valve 750 in the oil conduit 434), thus providing a neutral state although very short, allowing the engine to increase its speed to the level corresponding to the vehicle speed. Thus, the variation in engine revolution speed which would take place during shifting is suppressed, thus avoiding substantial shift shocks.

When the governor pressure drops further or the throttle pressure rises further during travelling with the second speed ratio, the 1-2 shift valve 20 is moved from the upshift position thereof to the downshift position thereof, allowing the oil pressure in the oil conduit 432 to be discharged toward the drain port 120a. As a result, the oil pressure acting on the servo apply chamber S/A disappears, releasing the brake B2. Thus, the first speed ratio is established by the engagement of the clutch C3 and the action of the one-way clutch OWC.

The operation in the case where the manual valve 4 is set to the "II" position while travelling with the fourth speed ratio with the manual valve 4 set in "D" position is described.

When the manual valve 4 is set in the "II" position, since the line pressure develops in the port 104d in addition to the port 104e, the line pressure is supplied to the oil conduit 414. The line pressure in the oil conduit 414 passes through the shuttle valve 504, shuttle valve 508 and oil conduit 440 to the port 124b of the 3-4 shift valve 24. When the line pressure acts on the port 124b, the spool 224 assumes the downshift position thereof. The line pressure in the oil conduit 414 is also admitted to the port 122a of the 2-3 shift valve 22, acting on the upper end of the plug 223 to urge it to move downward to the down position thereof as illustrated by the right half position thereof. As a result, the automatic transmission is forced to shift to the second speed ratio irrespective of the vehicle speed and thus is prevented from shifting to the third speed or fourth speed ratio.

The line pressure in the oil conduit 414 is admitted to the port 116e of the line pressure booster valve 16. Since the line pressure booster valve 16 assumes the lower half position thereof owing to the oil pressure acting on the port 116b the oil pressure in the port 116e is admitted to the port 116d and thus the line pressure develops in the oil conduit 428. This causes the line pressure to increase to its peak value irrespective of the opening degree of the throttle valve, so that brake B2 which is a band brake is applied strongly enough. Thus, a shift to the second speed ratio is effected swiftly and effective engine braking is provided without any delay.

Since the relationship between pressures acting on the 1-2 shift valve in this case is quite the same as in the case when the manual valve 4 is set in the "D" position thereof, the 1-2 shift valve 20 is movable depending upon the relation of the magnitude of the governor pressure to that of the throttle pressure. Therefore, the automatic shift between the first and second speed ratios is effected even when the manual valve 4 is set in the "II" position.

Although, as mentioned above, the line pressure is increased to its peak value irrespective of the throttle opening when the manual valve 4 is placed to the "II" position from the fourth speed ratio or the third speed ratio, the line pressure decreases in the following process to the same level as would be when the manual valve 4 is set in the "D" position once the automatic transmission shifts to the first speed ratio. The shift from the second speed ratio to the first speed ratio (i.e., when the 1-2 shift valve 20 moves to the downshift position thereof) causes the oil pressure in the oil conduit 432 to be discharged to the port 120i. Thus, the oil pressure acting on the left end of the spool 216 of the line pressure booster valve 16 after passing through the port 116b and the bore 216d of the spool 216 disappears, allowing the spool 216 to move to the upper half position thereof owing to the action of the spring 316, shutting off the communication between the oil conduit 414 and the oil conduit 428, allowing the oil pressure in the oil conduit 428 to be discharged to the port 116c. Thus, the pressure modifier valve 12 and the cut back valve 14 operate in the same manner as they do when the manual valve 4 is in the "D" position. In this circumstance, even if the 1-2 shift valve 20 is moved to the upshift position thereof again and the oil pressure develops in the oil conduit 432, the port 116b of the line pressure booster valve 16 is blocked by the land 216b of the spool 216, so that the line pressure booster valve 16 is held in the illustrated upper half position thereof. Therefore, even if the second speed ratio is selected again, the line pressure will not increase to its peak value. With this function of the line pressure booster valve 16, the shift shock upon a shift between the first speed ratio and the second speed ratio in the "II" position is suppressed as low as that in the "D" position.

When the manual valve 4 is set to the "I" position from the "D" position, the line pressure develops in the port 104f as well as in the ports 104d and 104e, allowing the line pressure to develop in the oil conduit 416. The line pressure in the oil conduit 416 is admitted to the port 134d of the manual first range pressure reducing valve 34. This line pressure passes through the port 134c and the oil conduit 448 to reach the port 134e, uring the spool 234 upward to an equilibrium state wherein the spool 234 slightly opens the drain port 134b. Thus, the oil pressure in the port 134e (i.e., the oil pressure in the oil conduit 448) will have a constant value which is lower than that of the line pressure and determined by the force of the spring 334. This constant pressure in the oil conduit 448 is admitted via the shuttle valve 502 and the oil conduit 436 to the port 120d of the 1-2 shift valve 20, acting on the upper side of the land 221a of the spool 221, urging the spool 221 to move downward and the spool 220 to move upward. As a result, as long as the governor pressure urging the spool 221 upward is less than a predetermined value, the spool 221 is held in the downshift position thereof (while the spool 220 is in the up position thereof). In this position of the spool 221, the line pressure in the oil conduit 432 is discharged to the drain port 120i, thus releasing the brake B2. At the same time, the port 120d of the 1-2 shift valve 20 is allowed to communicate with the port 120e thereof, allowing the constant pressure in the oil conduit 436 to be supplied to the brake B1. Therefore, the first speed ratio is established by the engagement of the clutch C3 and the engagement of the brake B1 where the effective engine braking is provided. Since if the governor pressure is greater than said predetermined value, the spool 221 of the 1-2 shift valve 20 does not move to the downshift position thereof even when the constant pressure from the first manual range pressure reducing valve 34 acts on the spool 221, the transmission does not shift down to the first speed ratio as long as the vehicle speed is higher than a predetermined value even if the manual valve 4 is placed to the "I" position, thus preventing the engine overrun.

The operation in the case when the manual valve 4 is set from the "N" position to the "R" position is described. When the manual valve 4 is placed to the "R" position, the line pressure develops only in the port 104b, and this line pressure is admitted via the oil conduit 408 to the clutch C1, and on the other hand it is admitted via the oil conduit 408, shuttle valve 502, and oil conduit 436 to the port 120d of the 1-2 shift valve 20. With this oil pressure acting on the port 120d, the spool 221 of the 1-2 shift valve is always shifted to the downshift position thereof (there is no governor pressure developed because no line pressure exists in the oil conduit 412), so that the oil conduit 436 is allowed to communicate with the oil conduit 438 so as to supply the line pressure to the brake B1. Therefore, the reverse drive is established by the engagement of the clutch C1 and that of the brake B1.

Hereinafter, reference is mode to FIG. 3 to describe the feature of the present invention.

Figure 3:
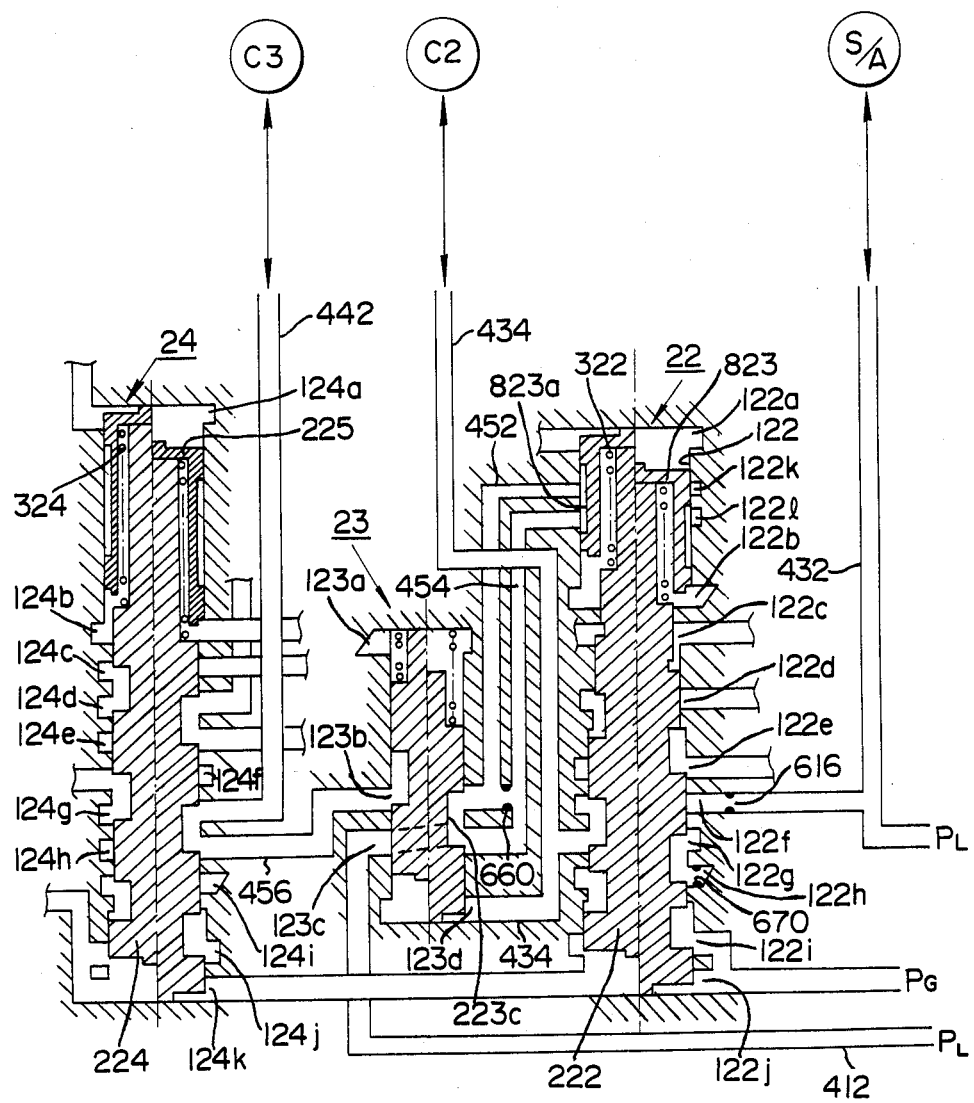
FIG. 3 is a diagram illustrating the embodiment shown in FIGS. 2(a), 2(b), 2(c) and 2(d) in a simplified manner.

As shown in FIG. 3, the port 122g (i.e., an outlet port) of the 2-3 shift valve 22 (i.e., a first shift valve) is allowed to communicate with the port 122f connected with the oil conduit 432 which is supplied with the line pressure when the 1-2 shift valve 20 (see FIG. 2(b)) assumes the upshift position thereof. The port 122k of the 2-3 shift valve 22 is connected with the port 123b of the 4-2 timing valve 23 via the oil conduit 452. The port 122l of the 2-3 shift valve 22 is connected with the port 123c of the 4-2 timing valve 23 via the oil conduit 454. The port 122k of the 2-3 shift valve 22 is allowed to communicate with the port 122l when the plug 823 of the 2-3 shift valve 22 assumes the up position thereof as indicated by the left half thereof as viewed in FIG. 3, but the former is prevented from communicating with the latter when the plug 823 of the 2-3 shift valve 22 assumes the down position thereof as indicated by the right half thereof as viewed in FIG. 3. The port 122g (i.e., an outlet port) of the 2-3 shift valve 22 is allowed to communicate with the port 122f when the 2-3 shift valve 22 assumes the upshift position thereof, i.e., when the spool 222 assumes the up position thereof as indicated by the left half thereof as viewed in FIG. 3. The port 122g is connected via the oil conduit 434 with the clutch C2 and also with the port 123d of the 4-2 timing valve 23. The port 124h (i.e., a second port) of the 3-4 shift valve 24 (i.e., a second shift valve) is connected via the oil conduit 456 with the port 123b of the 4-2 timing valve 23. When the 3-4 shift valve 24 assumes the downshift position thereof as indicated by the right half thereof as viewed in FIG. 3, the port 124h is allowed to communicate with the port 124g (i.e., a first port). This port 124g is connected via the oil conduit 442 with the clutch C3. The port 123c of the 4-2 timing valve 23 is connected with the oil conduit 412 which is supplied with the line pressure when the manual valve 4 is set in the "D" or "II" or "I" position.

The operation is hereinafter described.

First, the operation during 4-3 downshifting is described. During operation with the 4th speed ratio, the 2-3 shift valve 22, 4-2 timing valve 23 and 3-4 shift valve 24 assume their up positions, respectively, as indicated by left halves thereof as viewed in FIG. 3. Although not shown in FIG. 3, the 1-2 shift valve 20 also assumes the upshift position thereof, thus supplying the oil conduit 432 with the line pressure. The oil pressure in the oil conduit 432 is allowed to the servo apply chamber S/A of the brake 131, and the port 122f of the 2-3 shift valve 22 and the port 122g and the oil conduit 434, also to the clutch C2. On the other hand, the clutch C3 is connected via the oil conduit 443, port 124g and port 124f which is drained. In this state, if the 3-4 shift valve 24 is shifted to the downshift position thereof as indicated by the right half thereof as viewed in FIG. 3, the 4-3 downshifting is initiated. However, the 2-3 shift valve 22 stays in the upshift position thereof as indicated by the left half thereof as viewed in FIG. 3. When the 3-4 shift valve 24 assumes the downshift position thereof, the port 124g is allowed to communicate with the port 124h. This causes the oil conduit 442 to communicate with the oil conduit 456. To the oil conduit 456, the line pressure is supplied from the oil conduit 412 via the port 123c, the oil conduit 454, the ports 122l and 122k of the 2-3 shift valve 22, the oil conduit 452, and the port 123b of the 4-2 timing valve 23. As the oil conduit 452 is connected via the orifice device 660 with the oil conduit 454, the line pressure is supplied also via the orifice device 660. The line pressure is supplied to the clutch C3, thus establishing the 3rd speed ratio. In the manner described above, the oil pressure is supplied to the clutch C3 via the two flow paths, one bypassing the orifice device 660, the other via the orifice device 660. However, since the flow sectional area of the orifice device 660 is very small, the clutch C3 is engaged at a rate determined by the speed at which the oil flows through the flow path bypassing the orifice device 660. That is, the timing at which the clutch C3 is engaged for 4-3 downshifting is determined as independent from the size of the orifice device 660. Therefore, the clutch C3 is engaged at a comparatively fast speed during 4-3 downshifting.

Next, the operation during 4-2 downshifting is described. In 4-2 downshifting, the 3-4 shift valve 24 and 2-3 shift valve 22 are shifted from their upshift positions as indicated by the left halves thereof to their downshift positions as indicated by the right halves thereof as viewed in FIG. 3. This causes the port 124g of the 3-4 shift valve 24 to communicate with the port 124h like the manner mentioned during the 4-3 downshift. Since, however, the plug 823 of the 2-3 shift valve 22 is also shifted to the down position thereof along with the spool 222, the communication between the ports 122k and 122l of the 2-3 shift valve 22 is closed and the port 122g is allowed to communicate with the drain port 122h provided with the orifice 670. The oil begins to be discharged from the clutch C2 at a rate determined by the size of the orifice 670 provided in the drain port 122h. The 4-2 timing valve 23, on the other hand, stays in the up position thereof until the oil pressure in the port 123d (that is, the oil pressure in the clutch C2) drops below a predetermined value. That is, the 4-2 timing valve 23 does not assume the down position thereof until a predetermined period of time has elapsed after the shifting of the plug 823 to the down position thereof. Thus, during this period of time, the line pressure is kept supplied to the port 124h of the 3-4 shift valve 24 from the oil conduit 412, via the port 123c of the 4-2 timing valve 23, the orifice device 660, the port 123b of the 4-2 timing valve 23 and the oil conduit 456. Thereafter, the line pressure is supplied, via the port 124g of the 3-4 shift valve 24 and the oil conduit 442, to the clutch C3. That is, the clutch C3 is engaged at the timing determined by the flow rate of oil passing through the orifice device 660. Therefore, the timing at which the clutch C3 is engaged during 4-2 the 4-3 downshifting is determined by the flow sectional area of the orifice device 660. As a result, the clutch C3 is engaged at the delayed timing during 4-2 downshifting. That is, the engagement of the clutch C2 during the 4-2 downshifting is delayed as compared to the engagement thereof during 4-3 downshifting.

The purpose of providing the orifice device 660 is to extend a period of time where the instantaneous neutral state is established during 4-2 downshifting, resulting in a reduction is difference between an engine revolution speed before the shifting and that after the shifting which difference is big during the 4-2 downshifting as compared to the difference during the 4-3 downshifting. From the preceding description, it will be understood that the shifting performance during the 4-3 shifting and that during the 4-2 shifting have been set to optimum, respectively.

Accordingly, the above structure allows the engagement timing of the clutch C3 during 4-2 downshifting to be set independently from the engagement timing of the clutch C3 during 4-3 downshifting. It will now be appreciated that without relying on a complicated valve structure, the 4-3 downshifting and the 4-2 downshifting can be set optimum, respectively.

I claim:

1. A hydraulic control system for an automatic transmission which is shiftable into a n th speed ratio, a n+1 th speed ratio and a n+2 th speed ratio, the automatic transmission including a first friction unit and a second friction unit, the first friction unit being engaged and the second friction unit being released during operation with the n th speed ratio, the first and second friction units being engaged during operation with the n+1 th speed ratio, the first friction unit being released and the second friction unit being engaged during operation with the n+2 th speed ratio, where, n is a positive integer, the hydraulic control system comprising:

means for generating an actuating fluid pressure;

a first shift valve having a downshift position thereof and an upshift position thereof, said first shift valve assuming the downshift position thereof during operation with the n th speed ratio, said first shift valve assuming the upshift position thereof during operation with the n+1 th speed ratio and the n+2 th speed ratio;

a second shift valve having a downshift position thereof and an upshift position thereof, said second shift valve assuming the downshift position thereof during operation with the n th speed ratio and the n+1 th speed ratio, said second shift valve assuming the upshift position thereof during operation with the n+2 th speed ratio;

said second shift valve having a first port and a second port, said first port being allowed to communicate with said second port when said second shift valve assumes the downshift position thereof, the first port communicating with the first friction unit;

means defining a fluid supply passage having one end communicating with the second port and an opposite end communicating with said actuating fluid pressure generating means;

an orifice device fluidly disposed in said fluid supply passage;

said first shift valve having an inlet port communicating with said actuating fluid pressure generating means and an outlet port communicating with the second friction unit, said outlet port being allowed to communicate with said inlet port when said first shift valve assumes the upshift position thereof;

a timing valve means responsive to fluid pressure in said outlet port for providing a first bypass passage bypassing said orifice device to provide a first fluid flow path from said actuating fluid pressure generating means to said second port when fluid pressure in said outlet port is lower than a predetermined value; and means for providing a second bypass passage bypassing said orifice device to provide a second fluid flow path from said actuating fluid pressure generating means to said second port at least when said first shift valve assumes the upshift position thereof.

2. A hydraulic control system as claimed in claim 1, wherein said first shift valve has a drain port which is allowed to communicate with said outlet port when said first shift valve assumes the downshift position thereof, said drain port being provided with an orifice device so as to determine a rate at which fluid is discharged from the second friction unit.

3. In an automatic transmission which is shiftable from a n+2 th speed ratio down to a n+1 th speed ratio and also to a n th speed ratio, where n is a positive integer:

a first friction unit;

a second friction unit, said first friction unit being engaged with said second friction unit kept engaged during a shifting from the n+2 th speed ratio down to the n+1 th speed ratio, said first friction unit being engaged and said second friction unit being released during a shifting from the n+2 th speed ratio down to the n th speed ratio;

means for generating an actuating fluid pressure;

a first shift valve including a valve spool movable between a downshift position and an upshift position, said spool assuming the downshift position thereof during operation with the n th speed ratio, said spool assuming the upshift position during operations with the n+1 th speed ratio and the n+2 th speed ratio;

a second shift valve including a valve spool movable between a downshift position and an upshift position, said spool of said second shift valve assuming the downshift position thereof during operations with the n th speed ratio and the n+1 th speed ratio, said spool of said second shift valve assuming the upshift position thereof during operation with the n+2 th speed ratio;

said second shift valve having an inlet port and an outlet port communicating with said first friction unit, said outlet port being allowed to communicate with said inlet port when said spool of said second shift valve assumes the downshift position thereof;

means for defining a fluid supply passage connecting said inlet port of said second shift valve to said actuating fluid pressure generating means;

a flow restrictor provided in said fluid supply passage;

means responsive to the movement of said spool of said first shift valve for establishing a first bypass passage connected to said fluid supply passage bypassing said flow restrictor when said spool of said first shift valve assumes the upshift position thereof; and timing valve means responsive to a change in fluid pressure within said second friction taken place when said second friction unit is released for establishing a second bypass passage connected to said fluid supply passage bypassing said flow restrictor and in parallel to said first bypass passage.

4. An automatic transmission as claimed in claim 3, wherein said first bypass passage providing means includes an end plug movable within said spool of said first shift valve.

5. An automatic transmission as claimed in claim 4, wherein said timing valve means includes a spool movable responsive to the actuating fluid pressure supplied to said second friction unit.

* * * * *